United States Patent
Geiger et al.

[11] Patent Number: 5,885,325
[45] Date of Patent: *Mar. 23, 1999

[54] PROCESS AND APPARATUS FOR THE MANUFACTURE OF STEEL

[75] Inventors: Gordon H. Geiger, Minneapolis, Minn.; Asish K. Sinha, Cranberry Township; Achilles Vassilicos, Pittsburgh, both of Pa.; Zhiyou Du, Croton-on-Hudson, N.Y.

[73] Assignee: USX Corporation, Pittsburgh, Pa.

[*] Notice: The term of this patent shall not extend beyond the expiration date of Pat. No. 5,733,358.

[21] Appl. No.: 914,607

[22] Filed: Aug. 18, 1997

Related U.S. Application Data

[63] Continuation of Ser. No. 526,448, Sep. 11, 1995, Pat. No. 5,733,358, which is a continuation-in-part of Ser. No. 359,601, Dec. 20, 1994, abandoned.

[51] Int. Cl.[6] ..................................................... C21C 5/34
[52] U.S. Cl. ................................ 75/501; 75/556; 75/957; 266/144; 266/225
[58] Field of Search ............................ 75/501, 556, 957; 266/144, 225

[56] References Cited

U.S. PATENT DOCUMENTS

| 5,611,838 | 3/1997 | Fritz et al. | 75/10.38 |
| 5,733,358 | 3/1998 | Geiger et al. | 75/501 |

*Primary Examiner*—Melvyn Andrews
*Attorney, Agent, or Firm*—Armstrong, Westerman, Hattori, McLeland & Naughton

[57] ABSTRACT

A two stage reaction for the production of steel from iron carbide is carried out in two separate but interrelated reactors. In the first reactor, iron, carbide, with slag formers, is fed into a feed end and the reaction is well-mixed by the vessel geometry, the stirring action below-surface injection of oxygen and iron carbide feed, and the evolution of gases from the liquid metal bath. The product, containing about 0.5–2% carbon, is fed into the second reactor where it is refined with subsurface-injected oxygen. The second reaction is autogenous, and the evolved carbon monoxide is fed to the first reactor where it is burned with oxygen in a foamy slag, which, with post-combustion burning in the slag of CO evolved in the first reactor, and with iron carbide preheating with the sensible heat of the off-gas from the first reaction, makes that reaction also essentially autogenous.

40 Claims, 7 Drawing Sheets

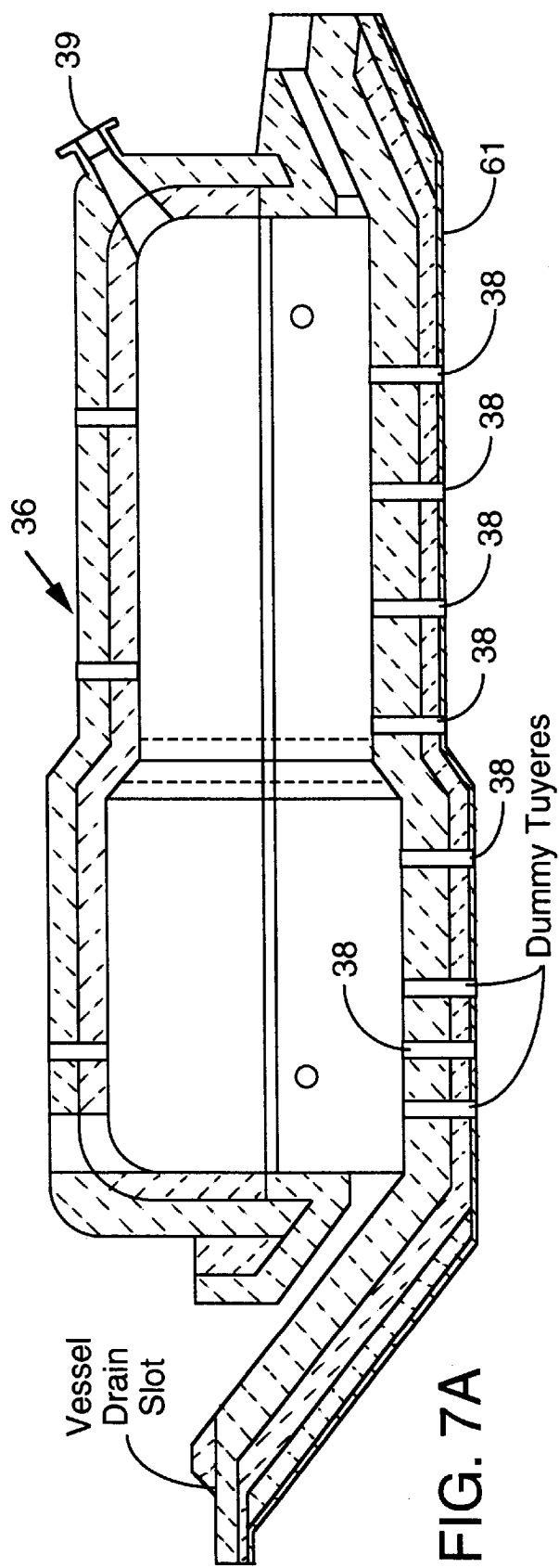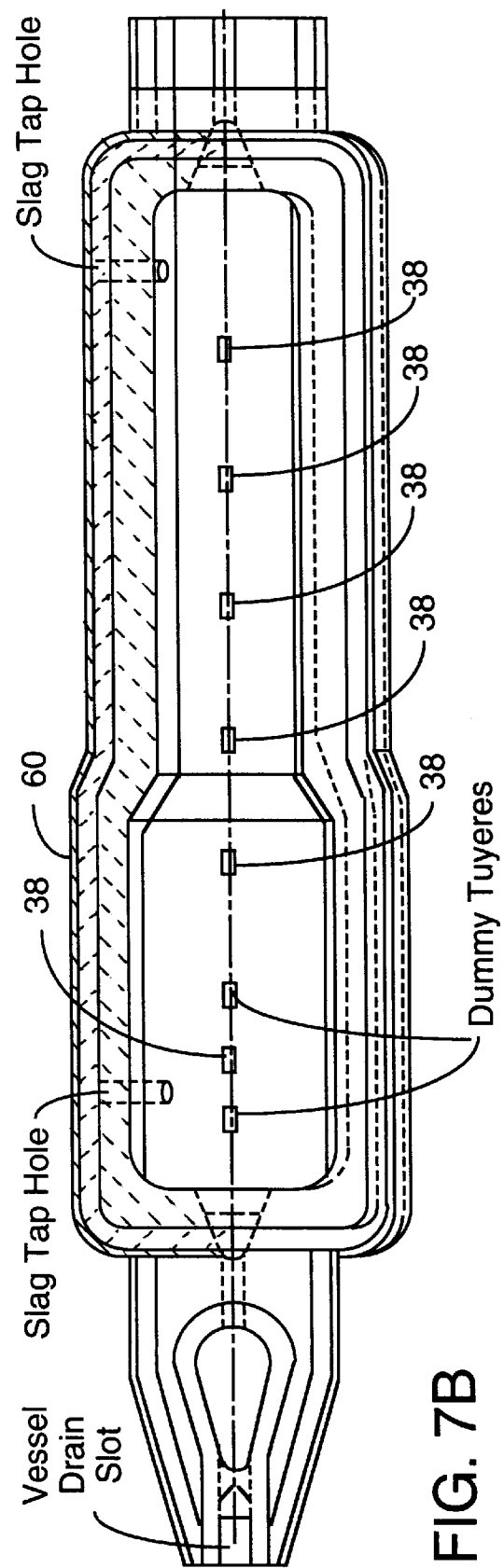

PROCESS AND APPARATUS FOR THE MANUFACTURE OF STEEL

This application is a continuation of application Ser. No. 08/526,448, filed Sep. 11, 1995 now U.S. Pat. No. 5,733,358 which is a continuation-in-part of application Ser. No. 08/359,601, filed Dec. 20, 1994; now abandoned.

BACKGROUND

1. Field of the Invention

This invention relates to apparatus and processes for the manufacture of steel from iron carbide in two tightly-coupled stages comprising a first stage reactor in which an iron-carbon alloy of intermediate carbon content is produced by combusting energy-rich gases, including such gases from a second stage reactor, in addition to energy-rich gas generated in the first reactor, and such iron-carbon alloy is used as feed to the second stage reactor in which steel of a final desired carbon content is produced.

2. Description of Related Prior Art

Stellung et al. U.S. Pat. No. 2,780,537 discloses a method of producing iron carbide and states that the product may be oxidized to iron in steel furnaces of known construction.

Kalling et al. U.S. Pat. No. 2,978,318 discloses continuous feeding of powdered material containing iron carbide into an inclined, rotary "Kaldo" type furnace for producing steel. The patent teaches that this feed material provides all the heat required for the reaction and does not introduce sulfur into the process.

Raquin et al. U.S. Pat. No. 3,486,882 teaches a process for the continuous production of steel that includes continuously introducing prereduced steel-forming material into a molten bath contained in a refining vessel and simultaneously introducing thermogenic material and gaseous oxygen into the vessel. The prereduced steel-forming material is iron ore which has been reduced between 40 and 100%. This material is introduced into the vessel at an elevated temperature and may contain carbon or other thermogenic elements in sufficient amount to provide necessary heat requirements for the process.

Rouanet U.S. Pat. No. 3,527,598 teaches carrying out a continuous steelmaking process in a reactor using carburized and non-carburized prereduced pellets. The total carbon content of the carburized and non-carburized pellets is such that the reaction with oxygen furnishes all of the heat required for carrying out the process.

Stephens Reissue U.S. Pat. No. 32,247 teaches a process for the production of iron carbide from iron ore by utilizing a fluid bed process. The iron carbide product then is fed into a steelmaking furnace, such as a basic oxygen furnace or an electric furnace, for the production of steel.

While the original Stephens patent, U.S. Pat. No. 4,053,301, describes the furnace as either a basic oxygen furnace or an electric furnace, the above Stephens reissue patent broadly claims a "steelmaking furnace." The Stephens reissue patent prosecution history also states that the type of furnace used in the steelmaking process of the invention is irrelevant to the primary novelty of the patent. Thus, the Stephens reissue patent prosecution history teaches that the Stephens process is not limited to a particular steelmaking furnace, but can include other prior art steelmaking furnaces such as, for example, a reactor vessel.

Additionally, the Stephens reissue patent teaches, at col. 2, lines 20–22, that the formation of iron carbide and its subsequent conversion to steel can be "one continuous operation." Stephens teaches, at col. 4, lines 16–21, that, when the hot iron carbide is added directly to the furnace, the process is "continuous and auto-thermal." Stephens also teaches that the off-gas from the furnace, which contains about 90% carbon monoxide, may be collected and combusted with oxygen to produce heat.

The concept of continuous production of steel, e.g. from iron ore, has been discussed by Queneau in "The QSL Reactor for Lead and its Prospects for Ni, Cu, Fe," *Journal of Metals,* December, 1989, pages 30–35, and also by Worner: WORCRA (Continuous) Steelmaking, Open Hearth Proceedings, 1969, pages 57–63, and Proceedings of the Savard/Lee International Symposium on Bath Smelting, Minerals, Metals & Materials Society, 1992, pages 83–101.

The Queneau or Queneau-Schuhmann process for continuous production of steel is similar in nature to the so-called "QSL" process for production of non-ferrous metals, e.g. lead and nickel. See, e.g. U.S. Pat. Nos. 3,941,587, 3,988,148 and 4,085,923 and the above-mentioned *Journal of Metals* article. This latter publication discloses an enclosed reactor vessel for direct and continuous production of steel from iron oxide ores. The QSL reactor is an enclosed system that is capable of limiting the ingress and egress of atmospheric gases and gaseous reaction products.

The WORCRA process and similar processes, such as that described by Rudziki et al. in Open Hearth Proceedings, 1969, pages 48–56, used top lance blowing of oxygen or combined top and bottom oxygen blowing to burn CO generated on top of the melt to generate additional heat for the process. Rudziki's process is used to decarburize liquid pig iron saturated with carbon.

In the so-called "IRSID" process, described by A. Berthet et al. at the International Conference of the Science and Technology of Iron and Steel, Tokyo, September, 1970, page 60 and following, hot metal, such as pig iron, is continuously charged into a reactor into which oxygen is top-blown onto a metal bath, causing formation of a slag/metal/gas emulsion wherein very rapid refining of the metal occurs. The refined steel then moves to a decanter vessel for slag/metal separation and tapping. Carbon content of the feed metal is 4–5% and there is no gradient of carbon level from the entry to the exit end of the reactor. This process also is described in French Patent No. 2,244,822.

Geiger U.S. Pat. No. 5,139,568 discloses a reactor vessel that receives solid mineral material feed. The mineral feed enters a molten metal bath that consists of a lower, denser iron-carbon alloy or metal layer and an upper, lighter slag layer (col. 6, lines 35–37). Oxygen is injected into the molten metal through submerged nozzles and reacts with carbon from the iron carbide to generate carbon monoxide. The carbon monoxide enters a vapor space above the molten bath (col. 6, lines 51–55), where it reacts with oxygen that is injected into the vapor space. The heat from the combustion of carbon monoxide in the vapor space is said to provide about 100% of the heat energy required for the continuation of the reaction in the reactor (col. 7, lines 11–22).

In the structure taught in the Geiger '568 patent, the amount of oxygen injected into the molten metal through the bottom of the reactor is varied along the length of the reactor (col. 9, lines 63–68). In this manner, a carbon content gradient is formed along the length of the reactor and a low carbon alloy is formed for removal at the removal end. Without forming a carbon content gradient, an iron-carbon alloy of sufficiently low carbon is not formed at the removal end of the reactor.

Additionally, in the reactor described in the Geiger '568 patent, the carbon monoxide reaction product passes into the vapor space and oxygen is injected into the vapor space for combustion with the carbon monoxide. The '568 patent teaches that the combustion of carbon monoxide occurs with the oxygen injected into the vapor space. Oxygen from the molten bath is a "highly unlikely" source of oxygen for combustion of the carbon monoxide. Significant amounts of carbon monoxide and oxygen must react in the vapor space to form sufficient heat to make the process self-sustaining or autothermal. Accordingly, all or substantially all of the carbon monoxide reaction product must enter the vapor space and be combusted there in order to generate sufficient heat to further drive the reaction and allow a self-sustaining or autothermal process.

Although the overall heat balance of the Geiger reaction may be substantially correct for his purpose, the problem with the single vessel and accompanying need for a carbon concentration gradient, is that the heat balance does not reflect where in the process there are energy deficits and energy excesses, and how to control and recover the energy release from the combustion of carbon monoxide to carbon dioxide—which is necessary to achieve the provision of energy at the location within the reactor where it is needed.

The Geiger '568 patent recognizes that, in order to operate such a single reactor continuously to achieve the desired low carbon content, a carbon concentration gradient must be maintained from the iron carbide feed end to the tap end of the reactor. The patent teaches that, for the process to be thermally autogeneous, oxygen must be introduced into the vapor space of the reactor to combust the CO generated in the molten metal bath, producing heat and $CO_2$. The heat so generated is envisaged as being substantially transferred to the molten metal bath and this is a necessary condition for maintaining a thermally autogenous process. However, that disclosure shows serious deficiencies. In the iron carbide feed end of the reactor, the predominant chemical reactions are endothermic, hence external heat is required to keep those reactions going. In the same region, gas evolution volume is high, resulting in a high rate of turbulent diffusion in the metal bath, leading to a well-mixed reaction region. In the remaining portion of the reactor, the predominant chemical reaction is exothermic (decarburization) and is accompanied by the generation of carbon monoxide providing an energy-rich fuel when combusted to carbon dioxide. Due to the elongated geometry of the Geiger reactor, a significant amount of carbon monoxide will be released into the vapor space at locations not in the vicinity of the energy-deficient region where iron carbide is fed into the reactor. Hence, the greater part of the energy released by combustion of carbon monoxide at locations distant from the iron carbide feed region will not reach that region because the radiation heat transfer view factor between that region and the remaining surfaces of the reactor is low. (The radiation heat transfer view factor is used in the art of heat transfer to characterize the effectiveness of radiative heat transfer between surfaces and between gases and surfaces.) Therefore, and from the standpoint of utilizing the greater part of the carbon monoxide energy in the energy-deficient iron carbide feed region, in the method disclosed by Geiger it is not possible to achieve thermal autogeneity. Another problem with the Geiger patent is in respect to the efficiency of utilization of carbon monoxide combustion energy stemming from carbon monoxide generated directly within the iron carbide feed region of the reactor. Since, in the Geiger process, all of this carbon monoxide is combusted in the vapor space of the reactor, the heat of combustion released will tend to be transferred equally well to both the bath surface and the dome refractory walls of the reactor forming the vapor space. In this way, the reactor dome refractory walls will get very hot which, in practice, would require provisions for water cooling. But, since the dome walls contain more surface area than the surface of the molten bath, significant heat losses to the dome walls of the reactor would be experienced. Thus, the amount of energy reaching the bath from the combustion of directly generated carbon monoxide will be only a fraction of the total energy generated. This additional factor further illustrates the point that the process as described in the Geiger patent falls short of being autogenous.

Sohn et al., in Proceedings of the Savard/Lee International Symposium on Bath Smelting, Minerals, Metals & Materials Society, 1992, pages 377–412, provide information concerning relationships between dimensions of a bottom-blown continuous refining reactor to minimize backmixing.

SUMMARY OF THE INVENTION

The present invention provides an improvement in the process of steelmaking from iron carbide in a steelmaking furnace, such as the process taught in the above-identified Stephens patents. In contrast to the single stage reactor vessels taught in the Stephens, Kalling, Queneau and Geiger patents, the present invention provides a two-stage process for the conversion of iron carbide to an iron-carbon alloy. The process of the invention uses two separate but tightly coupled reactors.

In the first stage of one embodiment of the present invention, heated iron carbide, which may contain some residual iron oxide, and slag forming materials are fed into a molten bath in the first reactor. The melted and dissolved iron carbide creates a lower layer of molten metal in the molten bath. A separate layer of foamy slag is formed above the molten metal in the bath. The foamy slag is characterized by a relatively thick layer of gaseous liquid, or foam.

Oxygen is injected into the molten metal bath, preferably through several submerged oxygen tuyeres in the bottom of the reactor. In contrast to the described gradient of carbon content that is formed along the length of the single reactor of the Geiger '568 patent, the injected gases, along with the carbon monoxide gas reaction product, provide a high stirring energy to achieve a well-mixed, gradient-free molten bath in the first stage reactor of the present invention. The well-mixed reaction also is facilitated by the vessel geometry (e.g. width vs. height of the metal bath). The stirring action necessary to generate a foamy slag precludes the formation of a carbon gradient in the molten bath.

In the first reactor, at least one oxygen stream is directed into the foamy slag for the purpose of combustion of carbon monoxide that has been generated in the molten metal bath and that has passed into and generated the foamy slag. Preferably at least 70%, more preferably at least 90%, and most preferably as close as possible to 100%, of the carbon monoxide generated in the melt, is combusted in the foamy slag. By combusting the carbon monoxide in the foamy slag, the greater part of the heat generated by the reaction is retained in the foamy slag and transferred directly back into the molten metal bath. Unlike the reactor of the Geiger '568 patent, the first stage reaction does not include injection of oxygen into the vapor space of the reactor and seeks to prevent passage of carbon monoxide into the vapor space for combustion there. However, in an alternate embodiment of the invention, oxygen can be top blown onto the liquid metal bath in the first stage reactor to aid in decarburization of that liquid metal.

The iron-carbon alloy produced in the first stage reactor, which may have a carbon content of, e.g., approximately 0.5–2%, then is used as a molten feed for the second stage reactor. Oxygen is injected into the molten metal bath through submerged tuyeres in the bottom of the second stage reactor. The reaction in the second stage reactor is exothermic, and the reaction product of the second stage reactor, a mixture of carbon monoxide and carbon dioxide, is collected, cooled, treated and then returned to the first stage reactor where it is preferably injected into the foamy slag layer and the carbon monoxide there burned with injected oxygen similar to the burning of the carbon monoxide evolved in the metal bath of the first reactor, for good heat transfer from the slag to the molten metal bath. [In one embodiment of the invention, oxygen also may be injected into the vapor space of the second stage reactor to burn a portion of the carbon monoxide in order to provide any additional heat that may be required to maintain a desired bath temperature.] Thus the two-reactor system is assured to be essentially autogenous. The output of the second stage reactor is an iron-carbon alloy (steel) with a carbon content of, e.g. approximately 0.01–0.5%.

BRIEF DESCRIPTION OF THE DRAWINGS

FIG. 7A is a cross-sectional view, in elevation, of the second stage reactor of the invention;

FIG. 7B is a cross-sectional plan view of the second stage reactor, and

DESCRIPTION OF PREFERRED EMBODIMENTS

Figure 1:
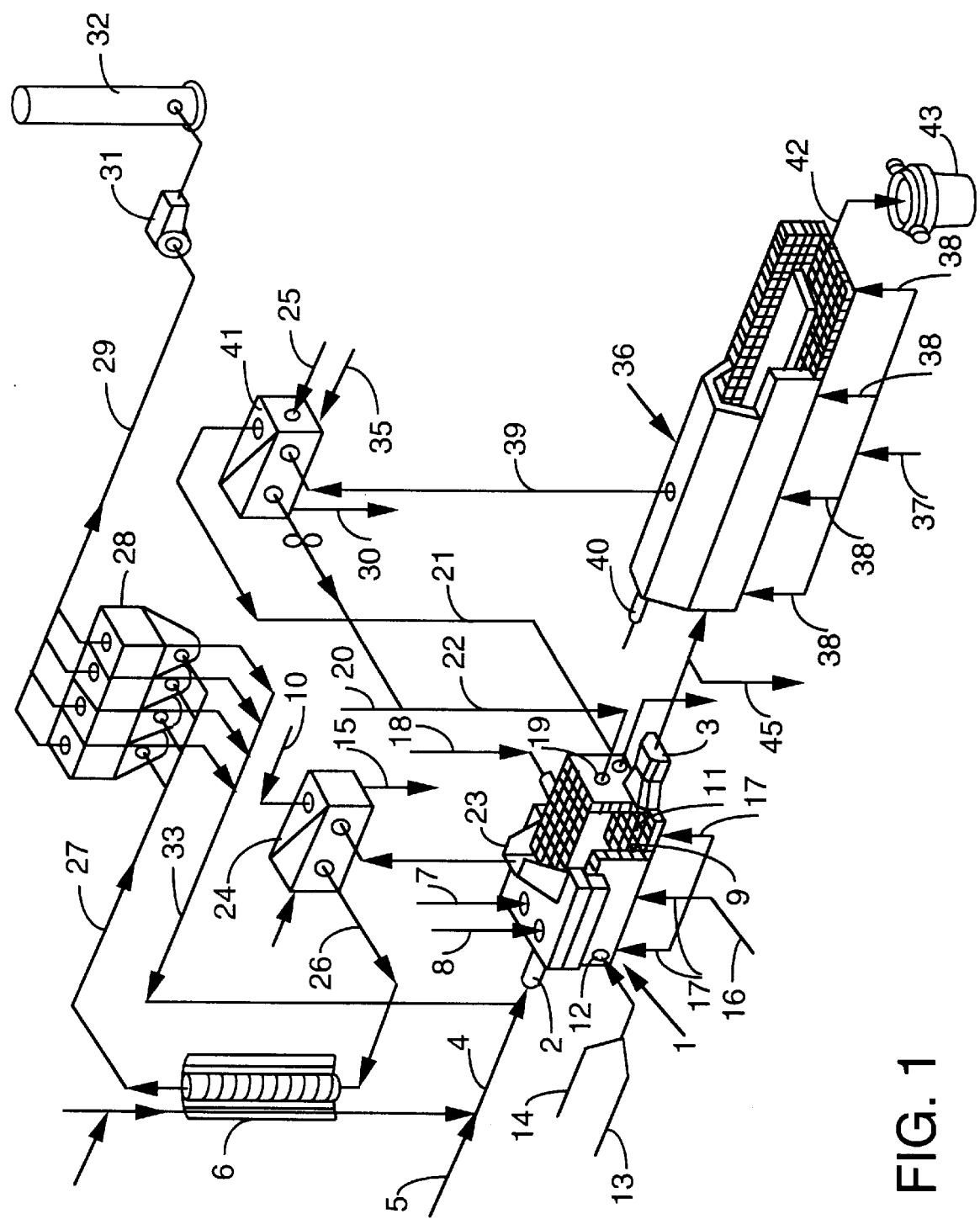
FIG. 1 is an isometric view of a steelmaking facility in accordance with the invention.

In FIG. 1, the numeral 1 generally denotes a first, refractory-lined, elongated reactor having a feed end 2 and an exit end 3. Iron carbide feed, having a composition of, e.g., 91% $Fe_3C$, 5% $Fe_3O_4$, 3% $SiO_2$ and 1% Fe, is fed through line 4 from a preheater 6 where it is heated to a preheat temperature, for example, of 550° C., and is carried by a stream 5 of nitrogen or $CO_2$ directly into a metal melt 9 contained in the first reactor where melting and dissolution of the iron carbide contributes significantly to a well-mixed reaction in that reactor. Slag-forming materials, such as lime, are fed in, through suitable equipment, as at 7 and, optionally, steel scrap is fed in at 8. The molten metal bath 9 is maintained in reactor 1 and is overlain with a foamy slag layer 11. A burner 12 is mounted near the feed end of reactor 1 and is fed with oxygen through line 13 and fuel, such as a hydrocarbon fuel, for example natural gas, through line 14. Burner 12 can be used to supply extra heat, as needed, and to heat or melt scrap or to heat reactor 1 on start-up (or liquid metal can be introduced from an outside source, such as a ladle, or electric arc furnace, for start-up purposes.) Decarburization oxygen is fed through header 16 to a plurality of tuyeres 17 which are shrouded with an endothermically decomposable gas such as a hydrocarbon gas (e.g. methane), or with other cooling gas such as carbon dioxide, argon, nitrogen or steam. The oxygen tuyeres for decarburization may be installed either below or above the metal bath line, or a combination of both. All or a portion of decarburization oxygen may be supplied to one or more lances (not shown) above the bath creating a high velocity jet which impinges on the metal bath. Post combustion oxygen is fed through one or more lines 18 to oxygen lances in the reactor walls to burn evolved carbon monoxide to carbon dioxide above the molten iron-carbon bath in the foamy slag. The post-combustion lances may be of various design, such as the through-wall lances as shown, or movable lances may be introduced through the mouth of the reactor vessel. A burner 19 is provided in one end wall of reactor 1 and is fed with oxygen through line 21 and carbon monoxide (with a small percentage of carbon dioxide) through line 22. As needed, supplemental fuel gas can be provided to burner 19 through line 20. Off-gas, consisting primarily of $CO_2$ with some water vapor and CO (depending upon the degree of post-combustion) is removed through off-take 23 at a temperature of e.g. about 1700° C. Any excess CO which is not burned in the foamy slag is externally combusted to 0% CO, and the off-gas is cooled, e.g. to a temperature of about 1100° C., in post-combustion chamber/heat exchanger 24 to which cooling water is introduced through line 10 and withdrawn through line 15. The partially cooled gas passes through line 26 to preheater 6 and from there through line 27 to a baghouse 28. Cleaned $CO_2$-rich off-gas then passes from the baghouse through line 29 to a fan 31 and stack 32 (or it can be collected for other use or sale). Solids from the baghouse are returned through line 33 to the iron carbide feed line for reintroduction into the first reactor.

Slag is removed, e.g. continuously, from a slag port 34 which, as shown, may be at the metal exit end of the first reactor.

The deslagged iron-carbon product of the first reactor is fed into a feed end of a second, refractory-lined elongated reactor denoted generally by the numeral 36. Alternatively, iron-carbon alloy with an intermediate carbon content can be removed from the first stage reactor, as at 45, and collected in a suitable vessel (not shown).

When the iron-carbon product of the first reactor is fed to the second reactor, oxygen is fed from header 37 to a plurality of gas-shrouded submerged tuyeres 38 and the off-gas, comprising mostly CO, e.g. 80% or more CO, is collected, at a temperature of e.g. about 1630° C., and sent through line 39 to an indirect heat exchanger 41 into which cooling water is introduced through line 25 and withdrawn through line 30. Oxygen to be preheated is introduced into exchanger 41 through line 35, from which it passes, through line 21, to burner 19 in the first reactor 1. Carbon monoxide, cooled to a temperature of about 300° C. and at a pressure of about 20 psig, passes through line 22 to burner 19. The fume evolved in the second reactor 36 is mostly fine iron droplets which pass with the gas to the first reactor. Larger sized particles, if present, can be removed, e.g. with use of a hot cyclone (not shown). If needed to maintain bath temperature in reactor 36, oxygen also may be introduced through lances (not shown) to burn a portion of the carbon monoxide, thereby providing heat to the bath. The final steel product exits reactor 36 as at 42, e.g. at a temperature of about 1670° C., and is collected in ladle 43.

Provision is made for preheating the interior of the second stage reactor prior to operation with oxy-fuel burners, as at 40, and for venting the combustion gases to atmosphere as needed.

In the present invention, the process of converting solid iron carbide into liquid steel has been analyzed from a staged heat balance point of view and it has been determined that the process must be separated into two distinct stages involving two separate but closely-coupled reactors, as shown in FIG. 1 and as above described. In the first stage reactor, the iron carbide material, preferably preheated, is introduced into a liquid iron-carbon bath, along with oxygen and sufficient flux needed to form a foamy slag with the gangue materials, principally silica with some alumina, that enter with the iron carbide. The iron carbide material preferably is injected continuously, although it may be injected periodically such that the level of the molten metal bath within the first reactor rises and falls commensurately. The carbide material typically has an analysis within the ranges given in Table 1, and is finely divided, with particle size typically in the range from 0.01 to 2 mm.

TABLE 1

Composition of Iron Carbide Material

| Constituent | Weight Percent of Material |
|---|---|
| $Fe_3C$ | 80–94 |
| $Fe_3O_4$ | 4–15 |
| Fe (metallic) | 0–2.0 |
| $SiO_2$ | 1–6 |
| $Al_2O_3$ | 0.1–2.0 |

The simultaneous injection of oxygen allows for the oxidation of the carbon from the iron carbide to carbon monoxide in the molten metal bath, providing heat. The carbon content of the bath is maintained at a steady-state level by matching the flows of iron carbide and oxygen stoichiometrically.

Figure 2:
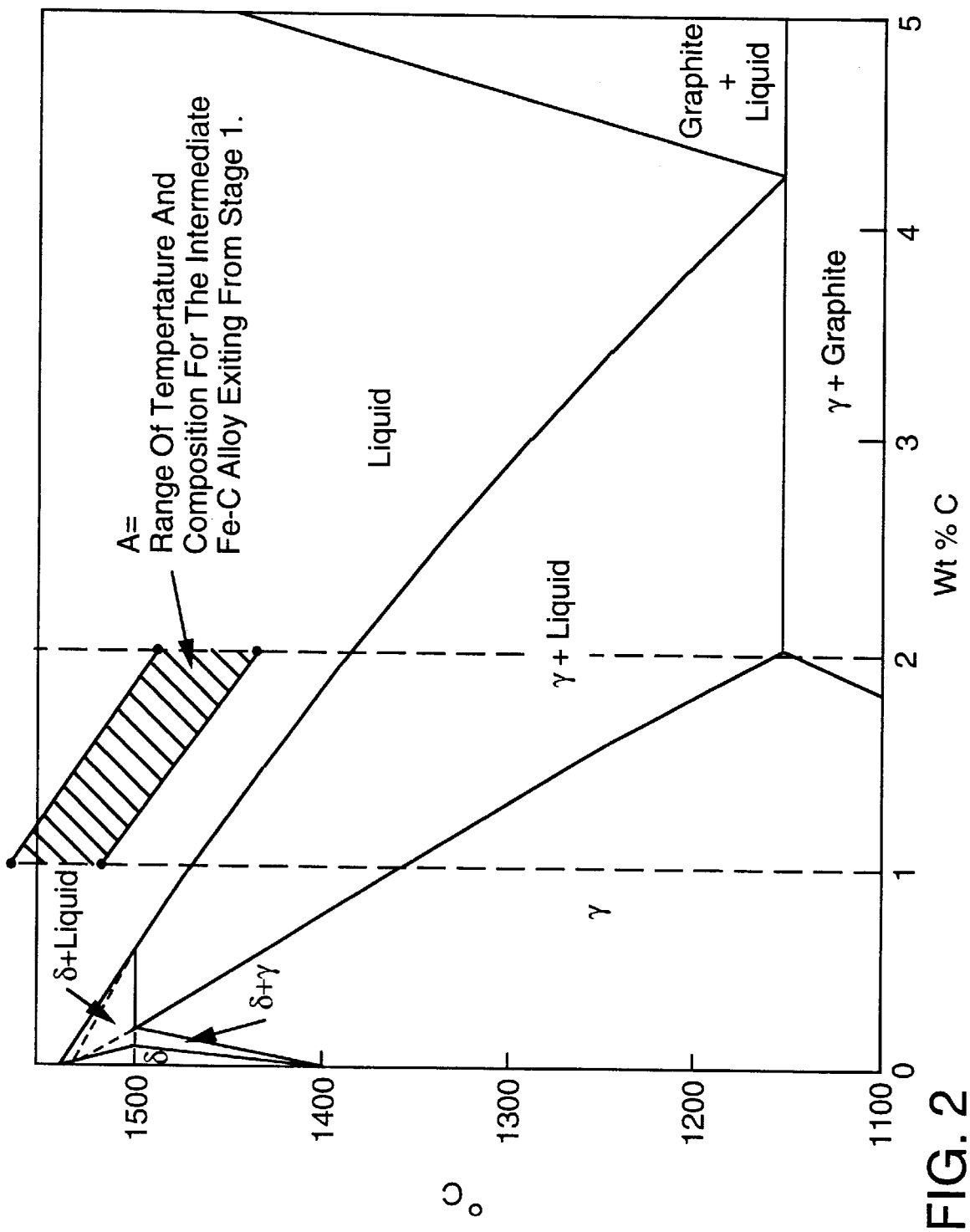
FIG. 2 is a temperature-composition diagram for the iron-carbon system, showing the range of iron-carbon alloys, in the liquidus region, corresponding to the temperature and composition of the intermediate iron-carbon alloys of the invention.

The output of the first reactor is a stream, preferably continuous, of liquid iron-carbon alloy with a composition between 0.5 and 2% by weight carbon, especially about 1 to 2% carbon, and at a temperature typically of 1490° C., but always above the liquidus of the iron-carbon phase diagram, as shown in area A of FIG. 2. This stream is the input to the second stage reactor.

In the second stage reactor, the carbon content of the liquid metal is lowered to the desired carbon level in the steel product to be made, e.g. from 0.01% to 0.5% carbon. This is accomplished by injecting oxygen into, and preferably under the surface of, the metal and exothermically producing a $CO$—$CO_2$ gas mixture. Thereby steel can be tapped at a temperature of about 1670° C.

Longitudinal or lengthwise backmixing of the metal bath in the second stage reactor has been minimized, and carbon gradient in the second stage reaction has been provided by several expedients. First, the vessel length is made much greater than the other two dimensions to induce plug flow. Second, oxygen required for carbon removal from the metal melt is supplied principally through bottom tuyeres, spaced apart, e.g. evenly, along the length of the reactor. The injected gas induces a vertical flow in the melt above it which also acts as a deterrent to longitudinal backmixing. Third, relationships have been established between the bath depth, bath width and the spacing between the tuyeres so as to further minimize backmixing flow. Fourth, the throughput of the second stage reactor has to be high enough so that the metal bath has sufficient force of forward flow towards the furnace exit to reduce any tendencies of the flow to turn around and move backwards. The second stage reaction process has been designed for about 50 to 150 or 200 tons per hour liquid steel throughput. For lower throughput tonnage, operational problems related to backmixing, higher heat losses, etc. may be encountered.

Another potential problem in the second stage reactor is the phenomenon of gas "blowthrough," where the melt depth would be insufficient to prevent some of the injected gas from blowing through the melt unreacted into the gas atmosphere above the metal bath. The invention provides a melt depth sufficient to overcome this problem.

The CO from the second stage reactor leaves the vessel at the same temperature as the steel, e.g. about 1670° C., and is collected and cleaned before being introduced as fuel into the first stage reactor, along with oxygen, to be burned to $CO_2$ in the foamy slag in the first stage reactor vessel. Most of the reducing CO produced in the second stage reactor is generated upstream in the furnace. Accordingly, the off-take port preferably is located near the metal exit end of the reactor to provide a reducing atmosphere over the entire bath. The combustion of this CO from stage 2 in the stage 1 reactor, and the provision made by the present invention to carry out this combustion within a foamy slag, makes the energy balance of the first stage (and of the two-reactor system) essentially autogenous, with no additional fuel needed, for example if the carbide material is heated to 550° C. prior to its injection, which can be done using the sensible heat in the off-gas from stage 1. If the carbide is not highly converted, and has, for example, 15% magnetite in it, this will make the reaction in stage 1 not quite autogenous. In such a case, or where a minor portion of cold steel scrap is added to the first stage reactor, some additional energy input may be required, e.g. in the form of natural gas, oil or coal burned in the vessel to make up the energy shortfall. These amounts of required additional energy are not large enough to result in significant changes to the design of the first stage reactor.

Examples of staged heat balances are given in Tables 2, 3, 4 and 5, for different sets of conditions, with a post-combustion degree of 0.7 in the slag of stage 1. Post-combustion degree refers to the fraction of total CO formed or injected into the stage 1 vessel that is transformed into $CO_2$ in the slag. Tables 6–9 are generally for the same conditions as in Tables 2–5, but with a post-combustion degree of 0.9 in the slag of stage 1.

TABLE 2

| A | B |
|---|---|
| Solution Conditions | |
| % Fe3O4 in carbide | 5 |
| % C in Fe—C int. | 1.5 |
| % Scrap | 0.0 |
| Degree Post-combustion[1] | 0.7 |
| Tonnes Steel/hr. | 50 |
| Percent C in steel | 0.05 |
| Tap temp, C. | 1630.00 |
| Scrap temp., C. | 25 |
| Carbide temp., C. | 550 |
| SOLUTION STAGE 2 | |
| Wsteel Kg/hr | 50000 |
| W(Int. Fe—C) Kg/hr | 51248.53 |

TABLE 2-continued

| A | B |
|---|---|
| Volume flow Fe—C, m3/hr | 7.11 |
| Wdust(Fe), 2, Kg/hr | 504.80 |
| WCO,2, Kg/hr | 1388.29 |
| WCO2,2, Kg/hr | 545.40 |
| Vol. CO,2 Nm3/hr | 1110.63 |
| Vol. CO2,2 Nm3/hr | 277.66 |
| Vol CO,2, at T, m3/hr | 7741.89 |
| Vol. CO2,2, at T, m/hr | 1935.47 |
| Total vol. int. gas, m3/hr | 9677.36 |
| WO2,2 Kg/hr | 1189.96 |
| STAGE 1 | |
| WCaO,1 Kg/hr | 3426.03 |
| Wscrap,1 Kg/hr | 0.00 |
| Wcarbide, Kg/hr | 57100.09 |
| Wslag, Kg/hr | 5525.86 |
| WCO,1 Kg/hr | 2351.73 |
| WCO2,1 Kg/hr | 9168.39 |
| Wdust(Fe), Kg/hr | 1113.75 |
| WO2,1, decarb Kg/hr | 3165.94 |
| WO2,1,PC,, Kg/hr | 3186.11 |
| WO2, suppl fuel, Kg/hr | 1515.01 |
| WCH4, Kg/hr | 378.75 |
| WH2O, Kg/hr, out | 852.19 |
| WCO2, suppl fuel, Kg/hr | 1041.57 |
| Excess Energy Stage 2, Kcal/hr | 909 |
| Excess Energy Stage 1, Kcal/hr | −3172942 |
| Energy from supplemental fuel, Kcal/hr | 3172942 |
| TOTAL | |
| Total O2, Nm3/tonne | 126.80 |
| Total dust, Kg/tonne | 22.25 |
| Total slag, Kg/tonne | 110.52 |
| Total flux, Kg/tonne | 68.52 |
| Total CH4, Nm3/tonne | 10.61 |
| Total carbide, Kg/tonne | 1142.00 |
| Total scrap, Kg/tonne | 0.00 |

[1] Degree of post-combustion is the ratio of $CO_2$ to $(CO + CO_2)$ or the ratio of $(CO_2 + H_2O)$ to $(CO + CO_2 + H_2 + H_2O)$.

TABLE 3

| A | B |
|---|---|
| Solution Conditions | |
| % Fe3O4 in carbide | 10 |
| % C in Fe—C int. | 1.5 |
| % Scrap | 0.0 |
| Degree Post-comb., in slag | 0.7 |
| Tonnes Steel/hr. | 50 |
| Percent C in steel | 0.05 |
| Tap temp, C. | 1630. |
| Scrap temp., C. | 25 |
| Carbide temp., C. | 550 |
| SOLUTION STAGE 2 | |
| Wsteel Kg/hr | 50000.00 |
| W(int. Fe—C) Kg/hr | 51248.53 |
| Volume flow Fe—C, m3/hr | 7.11 |
| Wdust (fe),2, Kg/hr | 504.80 |
| WCO,2, Kg/hr | 1388.29 |
| WCO2,2, Kg/hr. | 545.40 |
| Vol. CO,2 Nm3/hr | 1110.63 |
| Vol. CO2,2, Nm3/hr | 277.66 |
| Vol. CO, 2, at T, m3/hr | 7741.89 |
| Vol. CO2,2, at T, m3/hr | 1935.47 |
| Total vol. int. gas, m3/hr | 9677.36 |
| WO2,2, Kg/hr | 1189.96 |

TABLE 3-continued

| A | B |
|---|---|
| STAGE 1 | |
| WCaO, 1 Kg/hr | 3451.54 |
| Wscrap,1 Kg/hr | 0.00 |
| Wcarbide, Kg/hr | 57525.25 |
| Wslag, Kg/hr | 5567.01 |
| WCO,1 Kg/hr | 2233.23 |
| WCO2,1 Kg/hr | 8733.92 |
| Wdust(Fe), Kg/hr | 1113.77 |
| WO2,1, decarb Kg/hr | 2360.73 |
| WO2,1, PC, Kg/hr | 3028.12 |
| WO2, suppl fuel, Kg/hr | 3543.50 |
| WCH4, Kg/hr | 885.88 |
| WH2O, Kg/hr, out | 1993.22 |
| WCO2, suppl fuel, Kg/hr | 2436.16 |
| Excess Energy Stage 2, Kcal/hr | 909 |
| Excess Energy Stage 1, Kcal/hr | −7421287 |
| Energy from Supplemental Fuel, Kcal/hr | 7421287 |
| TOTAL | |
| Total O2, Nm3/tonne | 141.71 |
| Total dust, Kg/tonne | 20.25 |
| Total slag, Kg/tonne | 111.34 |
| Total flux, Kg/tonne | 69.03 |
| Total CH4, Nm3/tonne | 24.80 |
| Total carbide, Kg/tonne | 1150.51 |
| Total scrap, Kg/tonne | 0.00 |

TABLE 4

| A | B |
|---|---|
| Solution Conditions | |
| % Fe3O4 in carbide | 10 |
| % C in Fe—C int. | 1.5 |
| % Scrap | 0.0 |
| Degree Post-comb., | 0.7 |
| Tonnes Steel/hr. | 50 |
| Percent C in steel | 0.05 |
| Tap temp, C. | 1630 |
| Scrap temp., C. | 25 |
| Carbide temp., C. | 25 |
| SOLUTION STAGE 2 | |
| Wsteel Kg/hr | 50000.00 |
| W(Int. Fe—C) Kg/hr | 51248.53 |
| Volume flow Fe—C, m3/hr | 7.11 |
| Wdust(Fe),2, Kg/hr | 504.80 |
| WCO,2, Kg/hr | 1388.29 |
| WCO2,2, Kg/hr | 545.40 |
| Vol. CO,2 Nm3/hr | 1110.63 |
| Vol. CO2,2, Nm3/hr | 277.66 |
| Vol CO,2, at T, m3/hr | 7741.89 |
| Vol. CO2,2, at T, m3/hr | 1935.47 |
| Total vol. int. gas, m3/hr | 9677.36 |
| WO2,2, Kg/hr | 1189.96 |
| STAGE 1 | |
| WCaO,1 Kg/hr | 3451.54 |
| Wscrap,1 Kg/hr | 0.00 |
| Wcarbide, Kg/hr | 57525.25 |
| Wslag, Kg/hr | 5567.01 |
| WCO,1 Kg/hr | 2233.23 |
| WCO2,1 Kg/hr | 8733.92 |
| Wdust (Fe), Kg/hr | 1113,77 |
| WO2,1, decarb Kg/hr | 2360.73 |
| WO2,1, PC, Kg/hr | 3028.12 |
| WO2, suppl fuel, Kg/hr. | 5892.30 |

TABLE 4-continued

| A | B |
|---|---|
| WCH4, Kg/hr | 1473.08 |
| WH2O, Kg/hr, out | 3314.42 |
| WCO2, suppl. fuel, Kg/hr | 4050.96 |
| Excess Energy Stage 2, Kcal/hr | 909 |
| Excess Energy Stage 1 Kcal/hr | −12340464 |
| Energy from Supplemental Fuel, Kcal/hr | 12340464 |
| TOTAL | |
| Total O2, Nm3/tonne | 174.60 |
| Total dust, Kg/tonne | 22.25 |
| Total slag, Kg/tonne | 111.34 |
| Total flux, Kg/tonne | 69.03 |
| Total CH4, Nm3/tonne | 41.25 |
| Total carbide, Kg/tonne | 1150.51 |
| Total scrap, Kg/tonne | 0.00 |

TABLE 5

| A | B |
|---|---|
| Solution Conditions | |
| % Fe3O4 in carbide | 5 |
| % C in Fe—C int. | 1.5 |
| % Scrap | 10.0 |
| Degree Post-combustion | 0.7 |
| Tonnes Steel/hr. | 50 |
| Percent C in steel | 0.05 |
| Tap temp, C. | 1630 |
| Scrap temp., C. | 25 |
| Carbide temp., C. | 550 |
| SOLUTION STAGE 2 | |
| Wsteel Kg/hr | 50000.00 |
| W (Int. Fe—C) Kg/hr | 51248.53 |
| Volume flow Fe—C, m3/hr | 7.11 |
| Wdust (Fe),2, Kg/hr | 504.80 |
| WCO,2, Kg/hr | 1388.29 |
| WCO2,2, Kg/hr | 545.40 |
| Vol. CO,2 Nm3/hr | 1110.63 |
| Vol. CO2,2, Nm3/hr | 277.66 |
| Vol CO,2, at T, m3/hr | 7741.89 |
| Vol. CO2,2, at T, m3/hr | 1935.47 |
| Total vol. int. gas, m3/hr | 9677.36 |
| WO2,2, Kg/hr | 1189.96 |
| STAGE 1 | |
| WCaO,1 Kg/hr | 3080.37 |
| Wscrap,1 Kg/hr | 5133.00 |
| Wcarbide, Kg/hr | 51338.95 |
| Wslag, Kg/hr | 4968.33 |
| WCO,1 Kg/hr | 2104.62 |
| WCO2,1 Kg/hr | 8262.34 |
| Wdust(Fe), Kg/hr | 1001.37 |
| WO2,1,decarb Kg/hr | 2742.65 |
| WO2,1,PC, Kg/hr | 2856.64 |
| WO2, suppl fuel, Kg/hr | 2336.66 |
| WCH4, Kg/hr | 584.16 |
| WH2O, Kg/hr, out | 1314.37 |
| WCO2, suppl fuel, Kg/hr, out | 1606.45 |
| Excess Energy Stage 2, Kcal/hr | 909 |
| Excess Energy Stage 1 Kcal/hr | −4893745 |
| Energy from Supplemental Fuel, Kcal/hr | 4893745 |

TABLE 5-continued

| A | B |
|---|---|
| TOTAL | |
| Total O2, Nm3/tonne | 127.76 |
| Total dust, Kg/tonne | 18.21 |
| Total slag, Kg/tonne | 99.37 |
| Total flux, Kg/tonne | 61,61 |
| Total CH4, Nm3/tonne | 16.36 |
| Total carbide, Kg/tonne | 1026.78 |
| Total scrap, Kg/tonne | 102.66 |

TABLE 6

| A | B |
|---|---|
| Solution Conditions | |
| % Fe3O4 in carbide | 5 |
| % C in Fe—C int. | 1.5 |
| % Scrap | 0.0 |
| Degree Post-comb. | 0.9 |
| Tonnes Steel/hr. | 50 |
| Percent C in steel | 0.05 |
| Tap temp, C. | 1630 |
| Scrap temp., C. | 25 |
| Carbide temp., C. | 550 |
| SOLUTION STAGE 2 | |
| Wsteel Kg/hr | 50000.00 |
| W(Int. Fe—C) Kg/hr | 51248.53 |
| Volume flow Fe—C, m3/hr | 7.11 |
| Wdust(Fe),2, Kg/hr | 504.80 |
| WCO,2, Kg/hr | 1388.29 |
| WCO2,2, Kg/hr. | 545.40 |
| Vol. CO,2 Nm3/hr | 1110.63 |
| Vol. CO2,2, Nm3/hr | 277.66 |
| Vol CO,2, at T, m3/hr | 7741.89 |
| Vol. CO2,2, at T, m3/hr | 1935.47 |
| Total vol. int. gas, m3/hr | 9677.36 |
| WO2,2, Kg/hr | 1189.96 |
| STAGE 1 | |
| WCaO,1 Kg/hr | 3426.03 |
| Wscrap,1 Kg/hr | 0.00 |
| Wcarbide, Kg/hr | 57100.09 |
| Wslag, Kg/hr | 5525.86 |
| WCO,1 Kg/hr | 783.91 |
| WCO2,1 Kg/hr | 11632.11 |
| Wdust (Fe), Kg/hr | 1113.75 |
| WO2,1,decarb Kg/hr | 3165.94 |
| WO2,1,PC, Kg/hr | 4082.01 |
| WO2, suppl fuel, Kg/hr | 0.00 |
| WCH4, Kg/hr | 0.00 |
| WH2O, Kg/hr, out | 0.00 |
| WCO2, suppl fuel, Kg/hr | 0.00 |
| Excess Energy Stage 2 | 909 |
| Excess Energy Stage 1 | 113345 |
| Energy from Supplemental Fuel, Kcal/hr | 0 |
| TOTAL | |
| Total O2, Nm3/tonne | 118.13 |
| Total dust, Kg/tonne | 20.25 |
| Total slag, Kg/tonne | 110.52 |
| Total flux, Kg/tonne | 68.52 |
| Total CH4, Nm3/tonne | 0.00 |
| Total carbide, Kg/tonne | 1142.00 |
| Total scrap, Kg/tonne | 0.00 |

TABLE 7

| A | B |
|---|---|
| Solution Conditions | |
| % Fe3O4 in carbide | 10 |
| % C in Fe—C int. | 1.5 |
| % Scrap | 0 |
| Degree Post-combustion | 0.9 |
| Tonnes Steel/hr. | 50 |
| Percent C in steel | 0.05 |
| Tap temp, C. | 1630 |
| Scrap temp., C. | 25 |
| Carbide temp., C. | 550 |
| SOLUTION STAGE 2 | |
| Wsteel Kg/hr | 50000.00 |
| W(Int. Fe—C) Kg/hr | 51248.53 |
| Volume flow Fe—C, m3/hr | 7.11 |
| Wdust(Fe),2, Kg/hr | 504.80 |
| WCO,2, Kg/hr | 1388.29 |
| WCO2,2, Kg/hr. | 545.40 |
| Vol. CO,2 Nm3/hr | 1110.63 |
| Vol. CO2,2, Nm3/hr | 277.66 |
| Vol CO,2, at T, m3/hr | 7741.89 |
| Vol. CO2,2, at T, m3/hr | 1935.47 |
| Total vol. int. gas, m3/hr | 9677.36 |
| WO2,2, Kg/hr | 1189.96 |
| STAGE 1 | |
| WCaO,1 Kg/hr | 3451.54 |
| Wscrap,1 Kg/hr | 0.00 |
| Wcarbide, Kg/hr | 57525.25 |
| Wslag, Kg/hr | 5567.01 |
| WCO,1 Kg/hr | 744.41 |
| WCO2,1 Kg/hr | 11073.49 |
| Wdust (Fe), Kg/hr | 1113.77 |
| WO2,1,decarb Kg/hr | 2360.73 |
| WO2,1,PC, Kg/hr | 3878.88 |
| WO2, suppl fuel, Kg/hr | 2053.44 |
| WCH4, Kg/hr | 513.36 |
| WH2O, Kg/hr, out | 1155.06 |
| WCO2, suppl fuel, Kg/hr. | 1411.74 |
| Excess Energy Stage 2, Kcal/hr | 909 |
| Excess Energy Stage 1 Kcal/hr | −4300583 |
| Energy from Supplemental Fuel, Kcal/hr | 4300583 |
| TOTAL | |
| Total O2, Nm3/tonne | 132.76 |
| Total dust, Kg/tonne | 20.25 |
| Total slag, Kg/tonne | 111.34 |
| Total flux, Kg/tonne | 69.03 |
| Total CH4, Nm3/tonne | 14.37 |
| Total carbide, Kg/tonne | 1150.51 |
| Total scrap, Kg/tonne | 0.00 |

TABLE 8

| A | B |
|---|---|
| Solution Conditions | |
| % Fe3O4 in carbide | 10 |
| % C in Fe—C int. | 1.5 |
| % Scrap | 0 |
| Degree Post-combustion | 0.9 |
| Tonnes Steel/hr. | 50 |
| Percent C in steel | 0.05 |
| Tap temp, C. | 1630 |
| Scrap temp., C. | 25 |
| Carbide temp., C. | 25 |
| SOLUTION STAGE 2 | |
| Wsteel Kg/hr | 50000.00 |
| W (Int. Fe—C) Kg/hr | 51248.53 |
| Volume flow Fe—C, m3/hr | 7.11 |
| Wdust(Fe),2, Kg/hr | 504.80 |
| WCO,2, Kg/hr | 1388.29 |
| WCO2,2, Kg/hr. | 545.40 |
| Vol. CO,2 Nm3/hr | 1110.63 |
| Vol. CO2,2, Nm3/hr | 277.66 |
| Vol CO,2, at T, m3/hr | 7741.89 |
| Vol. CO2,2, at T, m3/hr | 1935.47 |
| Total vol. int. gas, m3/hr | 9677.36 |
| WO2,2, Kg/hr | 1189.96 |
| STAGE 1 | |
| WCaO,1 Kg/hr | 3451.54 |
| Wscrap,1 Kg/hr | 0.00 |
| Wcarbide, Kg/hr | 57525.25 |
| Wslag, Kg/hr | 5567.01 |
| WCO,1 Kg/hr | 744.41 |
| WCO2,1 Kg/hr | 11073.49 |
| Wdust(Fe), Kg/hr | 1113.77 |
| WO2,1,decarb Kg/hr | 2360.73 |
| WO2,1,PC, Kg/hr | 3878.88 |
| WO2, suppl fuel, Kg/hr | 4402.24 |
| WCH4, Kg/hr | 1100.56 |
| WH2O, Kg/hr, out | 2476.26 |
| WCO2, suppl fuel, Kg/hr | 3026.54 |
| Excess Energy Stage 2, Kcal/hr | 909 |
| Excess Energy Stage 1 Kcal/hr | −9219759 |
| Energy from Supplemental Fuel, Kcal/hr | 9219759 |
| TOTAL | |
| Total O2, Nm3/tonne | 165.65 |
| Total dust, Kg/tonne | 20.25 |
| Total slag, Kg/tonne | 111.34 |
| Total flux, Kg/tonne | 69.03 |
| Total CH4, Nm3/tonne | 30.82 |
| Total carbide, Kg/tonne | 1150.51 |
| Total scrap, Kg/tonne | 0.00 |

TABLE 9

| A | B |
|---|---|
| Solution Conditions | |
| % Fe3O4 in carbide | 10 |
| % C in Fe—C int. | 1.5 |
| % Scrap | 10.0 |
| Degree Post-combustion | 0.9 |
| Tonnes Steel/hr. | 50 |
| Percent C in steel | 0.05 |
| Tap temp, C. | 1630 |
| Scrap temp., C. | 25 |
| Carbide temp., C. | 500 |
| SOLUTION STAGE 2 | |
| Wsteel Kg/hr | 50000.00 |
| W(Int. Fe—C) Kg/hr | 51248.53 |
| Volume flow Fe—C, m3/hr | 7.11 |
| Wdust(Fe),2, Kg/hr | 504.80 |
| WCO,2, Kg/hr | 1388.29 |
| WCO2,2, Kg/hr. | 545.40 |
| Vol. CO,2 Nm3/hr | 1110.63 |
| Vol..CO2,2, Nm3/hr | 277.66 |
| Vol CO,2, at T, m3/hr | 7741.89 |

TABLE 9-continued

| A | B |
|---|---|
| Vol. CO2,2, at T, m3/hr | 1935.47 |
| Total vol. int. gas, m3/hr | 9677.36 |
| WO2,2, Kg/hr | 1189.96 |
| STAGE 1 | |
| WCaO,1 Kg/hr | 3100.93 |
| Wscrap,1 Kg/hr | 5168.00 |
| Wcarbide, Kg/hr | 51681.64 |
| Wslag, Kg/hr | 5001.49 |
| WCO,1 Kg/hr | 665.49 |
| WCO2,1 Kg/hr. | 9957.37 |
| Wdust(Fe), Kg/hr | 1000.63 |
| WO2,1,decarb Kg/hr | 2016.36 |
| WO2,1,PC, Kg/hr | 3473.01 |
| WO21 suppl fuel, Kg/hr | 2832.59 |
| WCH4, Kg/hr | 708.15 |
| WH2O, Kg/hr, out | 1593.33 |
| WCO2, suppl fuel, Kg/hr. | 1947.41 |
| Excess Energy Stage 2, Kcal/hr | 909 |
| Excess Energy Stage 1 Kcal/hr | −5932397 |
| Energy from Supplemental Fuel, Kkcal/hr | 5932397 |
| TOTAL | |
| Total O2, Nm3/tonne | 133.17 |
| Total dust, Kg/tonne | 18.19 |
| Total slag, Kg/tonne | 100.03 |
| Total flux, Kg/tonne | 62.02 |
| Total CH4, Nm3/tonne | 19.83 |
| Total carbide, Kg/tonne | 1033.63 |
| Total scrap, Kg/tonne | 103.36 |

The heat losses utilized in the calculations of Tables 2–9 are based on experience with similar sized vessels with refractory linings.

Preheating of the carbide material is done using the completely combusted off-gases from the first stage reactor, in an indirectly heated heat exchanger 6, for example, one comprising parallel slots alternately carrying heating gas and carbide counter-currently. The bulk carbide is preheated by flowing vertically through the slots, with hot gases flowing through adjacent slots. The thermal conductivity of the bulk carbide material is such that 2000 kg/min can be preheated in such a heat exchanger with approximate dimensions of 1.5×2×5 meters.

The major stage 1 problem in the utilization of the heat of combustion of the CO generated both in stage 1 and in stage 2 is the rate of transfer of the energy in the gas phase to the metal bath. From results in the basic oxygen furnace (an upright, tiltable, generally cylindrical converter), it is clear that only about 11% of the potential chemical energy from the complete combustion of CO to $CO_2$ typically is recovered in the metal bath in such furnaces, because of the upward flow of the waste gases, the heat sink effect of the water-cooled hood, and the intimate contact of the gases with the metal-slag emulsion which, for the most part of the process, is high in carbon (greater than 0.2% C) and, therefore, throughout the blowing cycle does not allow any $CO_2$ to survive in the vicinity of the metal-slag emulsion. This makes a basic oxygen furnace a difficult, if not impossible, furnace in which to carry out an autogenous process from a largely iron carbide feed. In the electric arc furnace, post-combustion of the CO emerging from the metal bath can take place but, since the cross-sectional area of the bath is very large, it is difficult to penetrate to the center or opposite sides of the furnace with the oxygen necessary to burn the CO generated in the bath, and overall utilization of the potential chemical energy from the oxidation of CO to $CO_2$ is difficult. The large bath area makes it difficult to provide a deep foamy slag layer in which to carry out post-combustion. Also, the walls and roof of the electric furnace are water-cooled, which rapidly absorb energy out of the furnace. Thus, neither the basic oxygen converter nor the electric furnace is optimal in regard to heat transfer efficiency.

That higher heat transfer efficiencies are achievable in other types of furnaces is exemplified by the data obtained from iron ore smelting reduction processes, such as DIOS and HIsmelt. These smelting processes involve the necessity of generating energy from the post-combustion of CO evolved from ore reduction and coal gasification in the smelter, and the transfer of the combustion heat to the metal bath and slag in order to supply the energy required for feed material heating and the endothermic reaction of reducing iron ore to metallic iron. Those data have provided a measure of the capability of heat transfer in a slag/metal bath system. A heat flux of 2 Gcal/hr/m$^2$ ($2 \times 10^9$ cal/hr/m$^2$) or higher was obtained in the DIOS system as calculated from data reported in an article by T. Ibaraki et al., Iron & Steelmakers, Vol. 17, No. 12, December 1990.

Transfer of energy of combustion from the gas phase in the freeboard region above the slag and metal can also be accomplished, but is not as intense as the transfer from slag to metal. Table 10 compares the fluxes of energy that can be expected for transfer from the gas phase to that between slag and metal.

TABLE 10

| Heat Transfer Requirements | |
|---|---|
| OUTPUTS | kcal/hr |
| Energy required in bath | 9943494 |
| Energy available in slag | |
| without supplemental energy | −8634903 |
| with supplemental energy | −9675074 |
| Energy required from gas | |
| without supplemental energy | 1308591 |
| with supplemental energy | 268420 |
| Achievable heat flux, kcal/hr/m$^2$ | |
| from slag to bath (smelting process data) | 2000000 |
| from gas to slag (calculated) | 150154 |
| Area required for heat transfer, m$^2$ | |
| from slag to bath | 4.97 |
| from gas to slag, w/o supp. energy | 8.71 |

From Table 10 it can be seen that the gas-to-slag heat flux is much lower than for slag to bath, that reliance on gas to slag heat transfer would require a very large vessel and, therefore, it is necessary, in order to have a reasonably sized vessel, to maximize the energy release of the post-combustion reaction directly into the slag phase.

As above noted, there is no need to maintain any chemical concentration gradient in the metal bath in the stage 1 reactor. Because of the large evolution of CO gas in the bath, and the melting and dissolution of the iron carbide, the stirring energy intensity is very large and the bath is well-mixed at all times. Table 11 gives typical mixing energy intensity values calculated for the stage 1 reactor.

TABLE 11

Typical Mixing Energy Intensity for Stage 1 Reactor

| | |
|---|---|
| CO evolved from $Fe_3O_4$ reduction, $Nm^3$/min | 18.41 |
| CO evolved from injected $O_2$, $Nm^3$/min | 89.63 |
| Total CO evolution, $Nm^3$/min | 108.4 |
| Mixing energy, watts/tonne | 35542 |
| Mixing time, secs, based on Nakanishi et al.[1] | 12 |
| Mixing time, secs, based on Kato et al.[2] | 22 |
| CO blowing rate, $Nm^3$/tonne-min. | 3.9 |

[1] Ironmaking & Steelmaking, vol. 3 (1975), page 193
[2] Kato, Y., Nakanishi, K., Saito, K., Nozaki, T., Suziki, K. and Emi, T., Tetsu-to-Hagane, 66, (1980), 11, S881

The stage 1 reactor preferably is operated in a continuous manner, with continuous feed of iron carbide, oxygen and fuel, continuously tapping metal and slag. (However, it can be operated in a semi-batch fashion, with a minimal initial liquid charge to which the iron carbide material is continuously added, steadily increasing the amount of metal in the vessel until it is tapped discontinuously. Such operation requires a somewhat deeper vessel.) The stage 1 reactor may be thought of as having three subzones: gas, slag and metal bath. At steady state, each zone has an energy balance that must be satisfied. In the case of the metal bath, solid iron carbide is injected directly into the bath and oxygen is injected through the submerged tuyeres. Even though the carbon from the iron carbide is oxidized continuously to CO by the oxygen, liberating heat within the metal phase, there still is not enough heat liberated to provide for the sensible heat and the heat of solution to melt and dissolve the carbide. Thus heat must be transferred from the slag phase to the metal phase. This heat must come from the combustion of CO to $CO_2$ in the slag phase by post-combustion lances and burners. The burners preferably burn the CO recovered from the stage 2 refining vessel, or may use another fuel such as natural gas. The slag preferably is of a composition that foams easily and allows for combustion to take place within the slag foam, thus retaining the heat of combustion in the slag phase, from which it can be transferred readily to the metal phase. Oxygen in the vapor space of the first stage reactor is limited and any CO unburned in the foamy slag normally will be combusted outside the reactor, e.g in post-combustion chamber/heat exchanger 24, as above explained. Computations of the energy balances of the subzones have been made for various operating conditions, and the areas between the zones required to transfer the heat needed to satisfy the inter-zone heat balances have been calculated. Based on these areas, the size of the vessel needed to reach a given production rate is established. Table 10 is an example of such a calculation.

The carbon concentration in the metal bath in the stage 1 reactor is maintained at the concentration desired for tapping and transport to the second stage reactor. The second stage reactor is a channel-type continuous refining vessel, with a series of submerged oxygen tuyeres, with the iron-carbon alloy preferably being steadily reduced in carbon content as the metal flows from one tuyere to another. Alternatively, the second stage reactor can be a well-mixed reactor vessel, with oxygen injected continuously into the metal bath in order to maintain the carbon content at all times at a desired level in the steel product. Still further, the second stage reactor can be a semi-batch reactor, with a steady input of the first stage product and gaseous oxygen, but with no tapping until the weight and carbon content are equal to the desired steel batch size and composition. In all three cases, the CO gas is collected without dilution of air for use as a fuel in stage 1.

The stage 2 exothermic reaction is autogenous, without any supplementary fuel needed if, for example, (1) the carbon content of the incoming iron-carbon liquid from stage 1 is about 1.35%, the incoming temperature is about 1520° C., the final steel carbon content is about 0.05%, and the steel temperature is about 1670° C., or (2) the incoming liquid alloy carbon content is about 1.0%, and the temperature is about 1500° C., the steel composition is about 0.05%, and the steel temperature is about 1650° C. Many such combinations exist that will result in an autogeneous stage 2, within the general limits of the temperature and composition as shown in area A of FIG. 2 for the incoming iron-carbon liquid from stage 1. In other cases, post-combustion oxygen can be introduced into the vapor space of the second stage reactor to burn a portion of the CO, if supplemental heat is needed.

Figure 3:
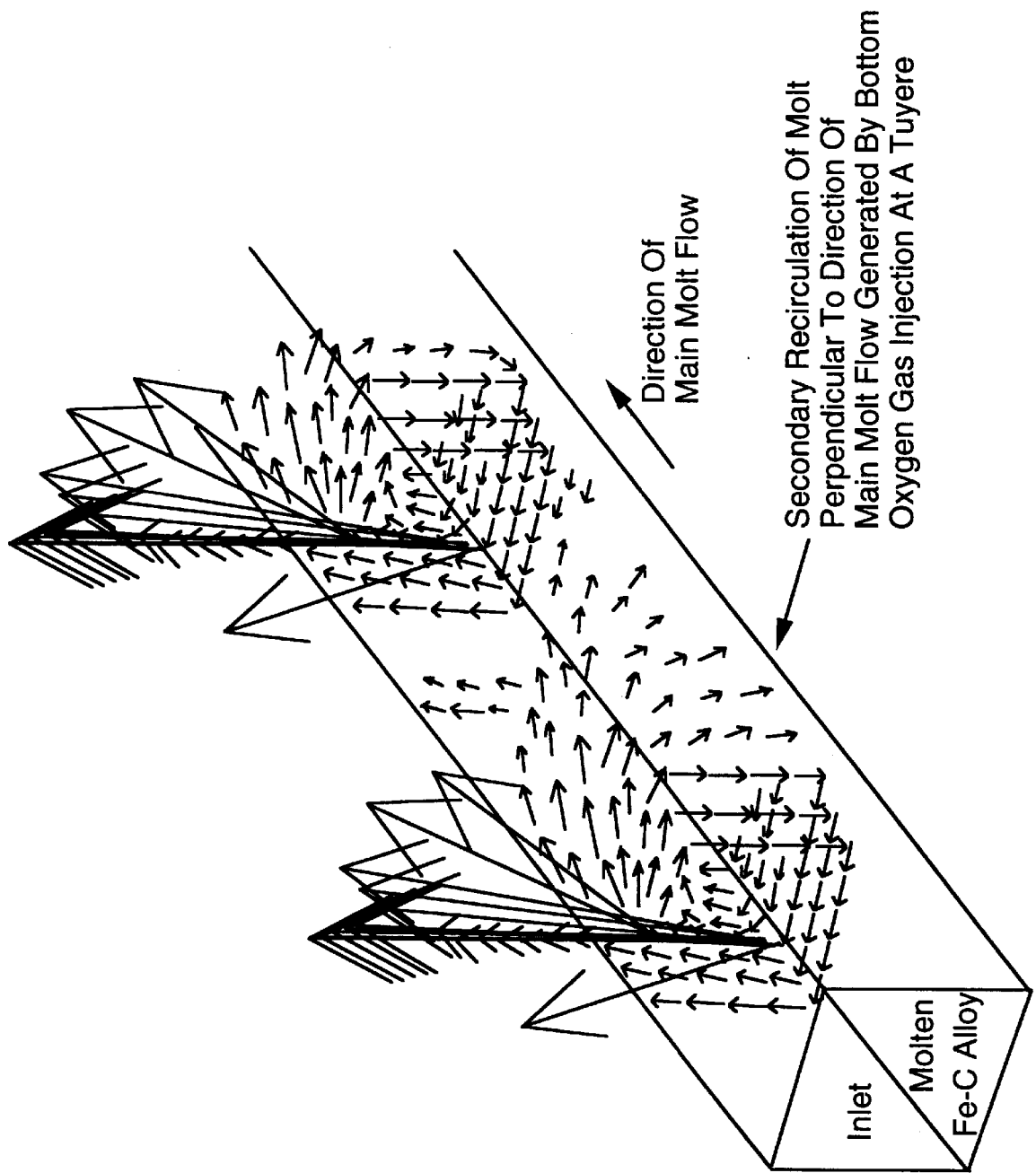
FIG. 3 is a velocity profile in a portion of the second stage reactor, showing high metal bath velocities in the region of the subsurface tuyeres.

The CO-rich gas leaves the second stage reactor at the steel temperature, since it is created within the steel bath, and, preferably, no oxygen is added to the gas phase. If a continuous flow reactor is used, the oxygen tuyeres may be spaced about 1.0–1.5 meters apart and the channel through which the metal flows must be of such cross-sectional area that the plug flow velocity of the metal is at least about 0.5–1 meter per minute, in order to prevent backmixing. Mixing patterns in a portion of such a vessel are shown in FIG. 3. As shown in that Fig., a marked upward velocity is imparted to the metal immediately above each tuyere, and there is a distinct circulatory pattern about each plume of metal rising above the tuyere. Such patterns, with a sufficient forward flow of metal imparted by the vessel geometry, effectively minimize backmixing in the reactor and establish a concentration gradient of carbon in the bath.

The second stage reactor is completely enclosed, so that the CO emitted from the bath can be collected without exposure to air or other oxygen sources. Like the first stage reactor, the second stage reactor also is refractory-lined to minimize heat losses.

If the second stage reactor is operated in a semi-continuous manner, means have to be provided to open and close the metal tap hole intermittently. In such case, there is no need to maintain a concentration gradient of carbon from one end to the other, and the vessel can be operated as a well-mixed reactor.

Figure 4:
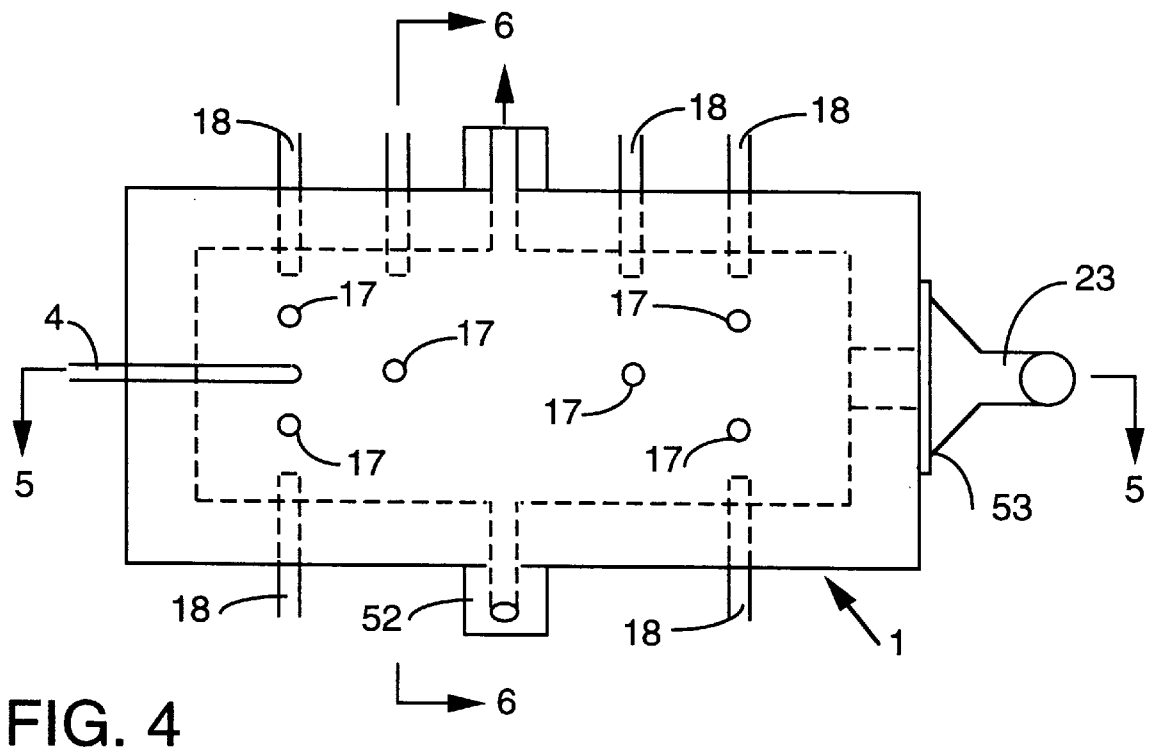
FIG. 4 is a plan view of a first stage reactor in accordance with the invention.
Figure 5:
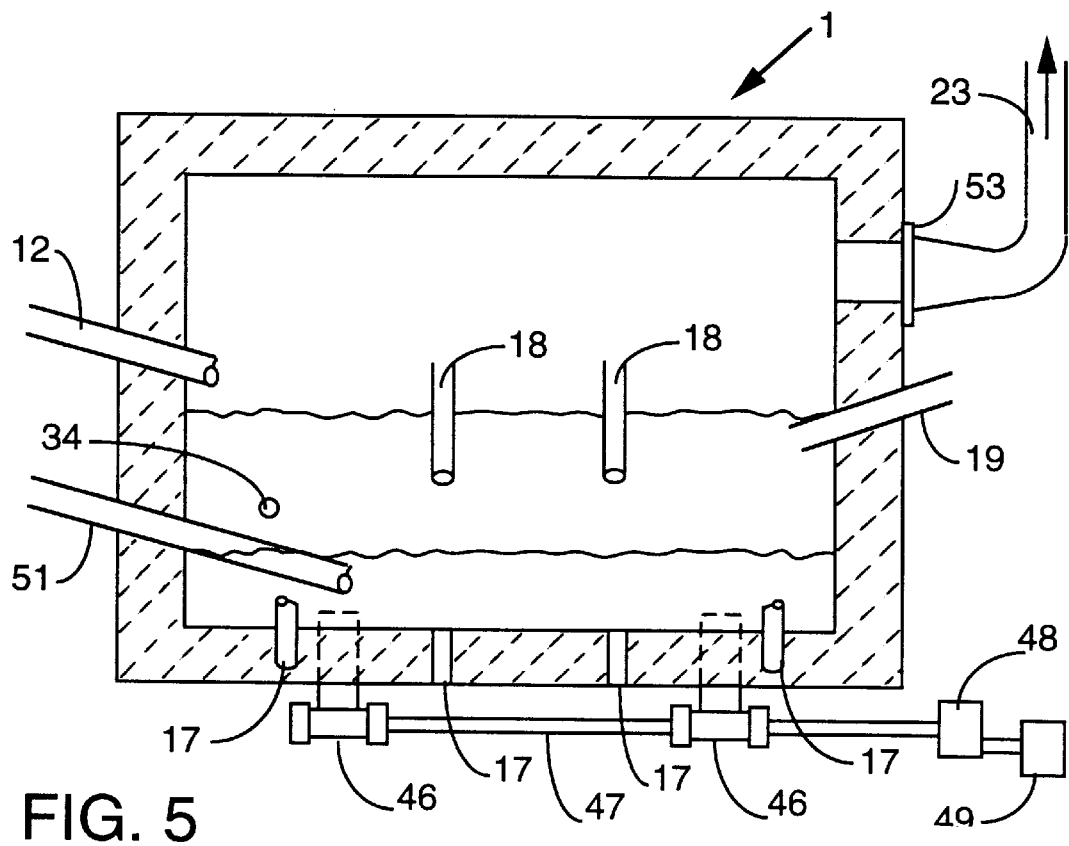
FIG. 5 is a side elevational view of the first stage reactor taken on line AA of FIG. 4.
Figure 6:
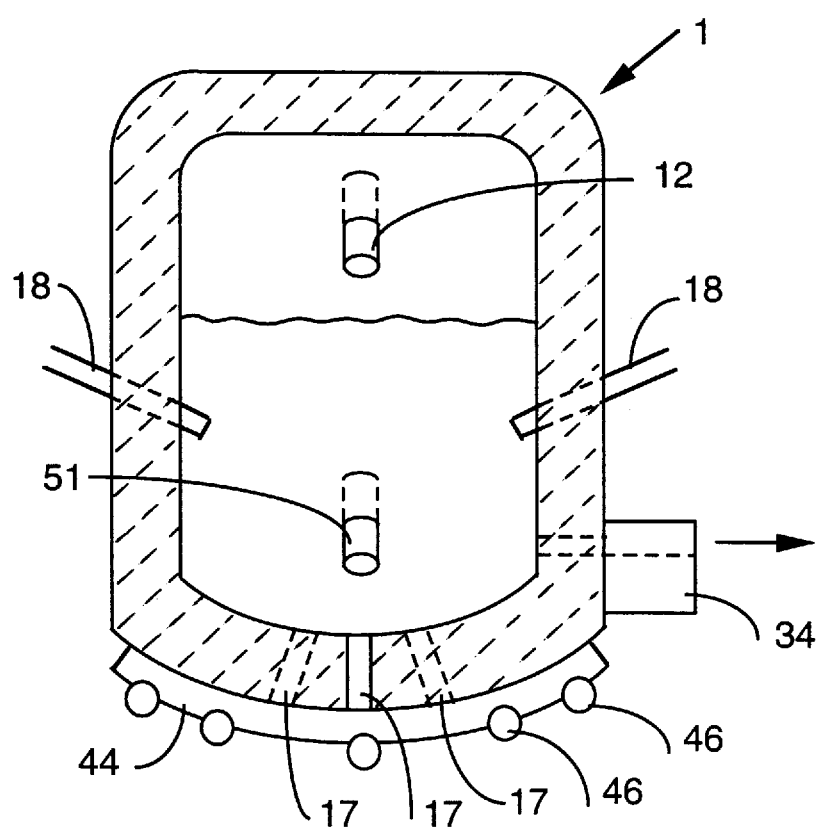
FIG. 6 is an end elevational view of the first stage reactor taken on line BB of FIG. 4.

Using data as above described and exemplified, a system was designed, based on the conditions indicated in Table 2, to produce 50,000 kg/hour of steel from iron carbide. There is shown in FIGS. 4, 5 and 6 such an exemplary first stage reactor which, in conjunction with a corresponding second stage reactor, is capable of producing steel at such a rate and containing about 0.05% C at a temperature of about 1630° C. As shown in FIG. 4, the first stage reactor is generally rectangular in plan view, and has a rounded bottom 44 as shown in FIG. 6. The first stage reactor may be tiltable, for example, as shown in FIG. 6, it may ride on rollers 46 and be tiltable by means of drive shaft 47, through a gear box 48, by means of a motor 49 (FIG. 5). A tilting action of the reactor facilitates servicing and maintenance of the subsurface tuyeres 17, furnace relining, etc.

The refractory-lined reactor 1 of FIG. 4 has an inside width at the slag line of about 2 meters and an inside length of about 5 meters. The distance from the lowest point of the bottom to the metal bath surface is about 0.7 meters at steady state operation; the distance from the low point of the bottom to the top of the slag is about 2.5 meters (slag foam depth is preferably no more than 2.0 meters above the metal bath under steady state operation), and from the low point of the bottom to the inside of the roof is about 4.0 meters.

A steady state feed of 1000 kg/min of iron carbide (TABLE 1) is maintained continuously, through a single lance 51 which may be simple steel pipe. With such high rates of iron carbide injection, it is difficult or impossible to operate the first stage reactor in plug flow. In fact, as above noted, injection of the iron carbide feed directly into the metal melt contributes significantly to the well-mixed reaction in the first stage reactor. As also above noted, this is another shortcoming of the Geiger U.S. Pat. No. 5,139,568. Lance 51 is retractable and is submerged in the metal bath, e.g. at least 30 cm below the slag when in operation. Dense phase flow of iron carbide is maintained, with a 100 pound iron carbide to 1 pound of carrier gas typical ratio. The carrier gas preferably is carbon dioxide or nitrogen. Weight of metal in the bath at steady state is 32 tons.

Burner 19, capable of burning up to 1200 Nm$^3$/hr of CO from the second stage reaction with oxygen is positioned in the end wall of the reactor nearest the stage two reactor about 2.3 meters above the low point of the bottom, and aiming downward at an angle of about 30 degrees. Burner 19 also is provided with a natural gas supply line 20 so that natural gas can replace the CO at a maximum total energy input rate of about 5×10$^6$ Kcal/hr.

Natural gas/oxygen burner 12 is installed, in a similar fashion, at the opposite end from the CO burner and capable of energy input rates from 0 to 5×10$^6$ Kcal/hr.

Four to eight submerged gas-shrouded tuyeres 17 are located in the furnace bottom, allowing the continuous injection of about 40.8–45 Nm$^3$/min of oxygen, evenly divided between the tuyeres, along with about 6.8–8.0 Nm$^3$/min of natural gas or 10.2–11.2 Nm$^3$/min of CO$_2$ or N$_2$, as tuyere coolant, evenly divided among the tuyeres.

Four to eight post-combustion lances 18, allowing for the injection of about 35 Nm$^3$/min of oxygen, which may be evenly divided among the lances, are located in the sidewalls of reactor 1, for example about 1 meter above the metal bath, i.e. within the foamy slag layer. These lances are angled down at an angle of, for example about 25–30 degrees, toward the metal bath and extend into the slag phase. The oxygen so injected serves to post-combust the CO evolved from the first stage reaction to CO$_2$ within the foamy slag.

Metal is continuously tapped from a tapping port 52 and metal bath level is maintained at about 0.7 meters during steady state operation.

Furnace gases, primarily CO$_2$, as well as fume, are removed from the first reactor, through a sliding seal 53 (FIGS. 4 and 5) preventing significant ingress of air and connecting to the off-take duct 23.

The reactor design is such that tapping, gas injection, and waste gas removal is accomplished without substantial ingress of air and thereby reducing investment in waste gas handling and NOx formation.

For ease in refractory repair, a replaceable top half of the reactor may be provided.

Intermediate iron carbon alloy (with a typical composition of 1.0–1.5% C and a temperature of 1490–1540° C.) is transferred from the first stage reactor to the second stage reactor without slag and with as little temperature loss as possible. For this purpose, the molten metal from the first stage is transferred, for example, through a tiltable, bifurcated runner trough or intermediate holding vessel (not shown). Alternatively, molten metal, or a portion thereof, may be withdrawn and solidified in the form of either pigs or granules. A heat balance for the first stage reactor is given in Table 12 below for the conditions described in Table 6.

TABLE 12

Heat Balance - First Stage

| Heat In | Kcal/hr | Heat Out | Kcal/hr |
| --- | --- | --- | --- |
| Scrap | 0 | | |
| Fe$_3$C in carbide | −4221205.88 | CO$_2$ | 5603686.36 |
| Fe$_3$O$_4$ in carbide | −316767.64 | CO | 369827.96 |
| SiO$_2$ in carbide | −220231.96 | Fe—C int. | 15782894.27 |
| CO$_2$ from Stage 2 less heat loss | −15621.36 | slag (as 2CaOSiO$_2$) | 2138419.65 |
| CO from Stage 2 less heat loss | −62453.86 | dust reaction: | 436281.24 |
| | | 4Fe$_3$C + Fe$_3$O$_4$ = 15Fe + 4CO | 1714063.08 |
| Fe (metallic) in carbide Reaction: | −19539.78 | | |
| | | reaction: | |
| CO + 1/2 O$_2$ = CO$_2$ | −17119880.14 | C (gr) = C in solution | 370561.01 |
| Heat of formation of slag Reaction: | −786938.43 | heat loss | 3283233.27 |
| Fe$_3$C + 1/2 O$_2$ = 3Fe + CO Reaction: | −5666999.29 | | |
| Fe$_3$C = 3Fe + CO | −370270.60 | | |
| heat of dust formation | −899057.91 | | |
| energy needed from supplemental fuel, Kcal/hr. | 0.00 | | |
| TOTALS | −29698966.85 | | 29698966.85 |

Figure 8:
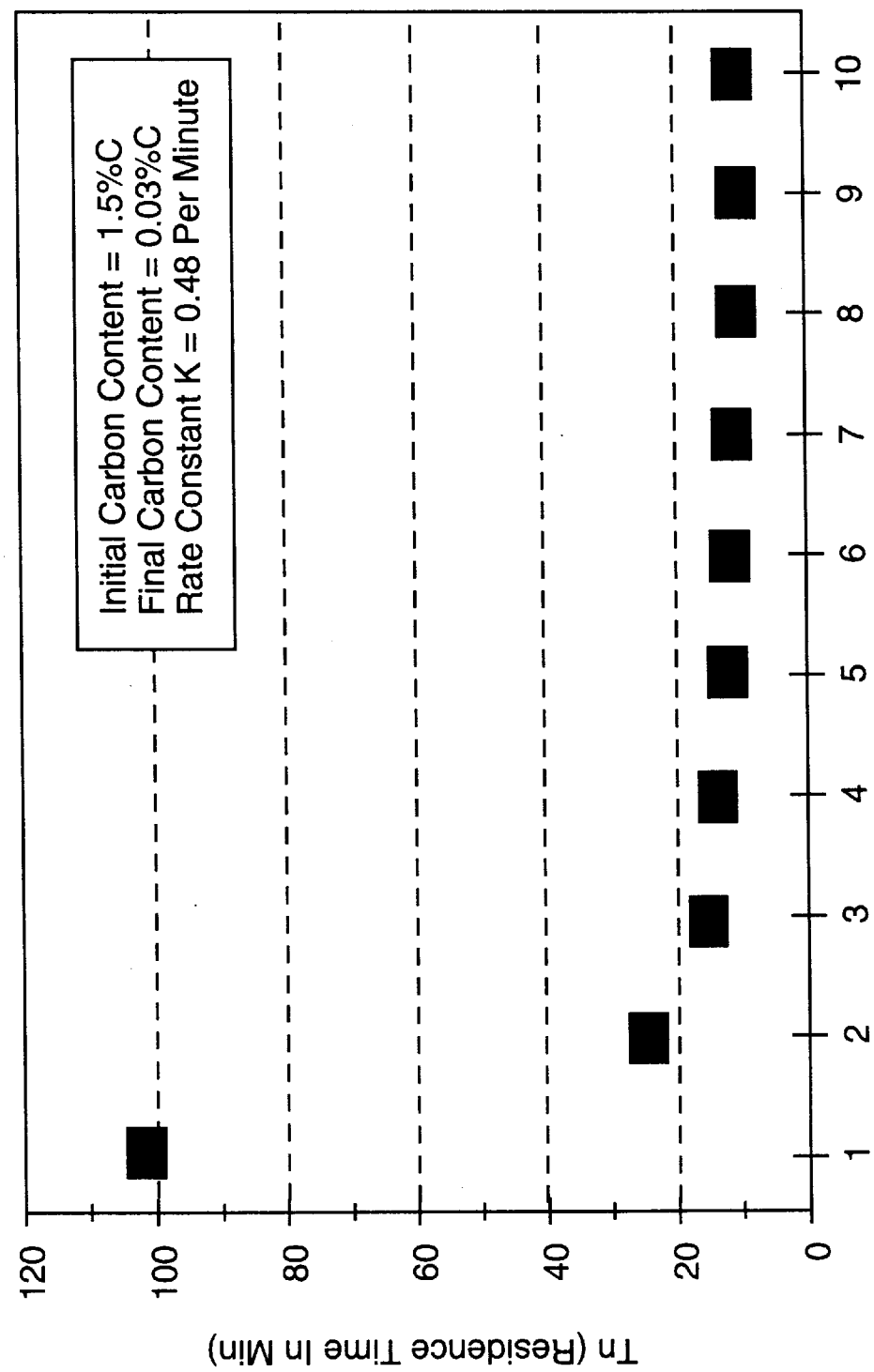
FIG. 8 is a graph relating residence time of the metal in the second stage reactor with the number of oxygen tuyeres in that reactor.

The refractory-lined second stage reactor 36 is for the purposes of (1) removing carbon from the liquid iron-carbon alloy from stage one by the injection of oxygen into the stream of molten metal through gas-shrouded bottom tuyeres 38, (2) collecting the carbon monoxide gas formed by the reaction of carbon and oxygen for use as a fuel in the first stage, and (3) tapping a steady stream of steel into a collection ladle 43 for adjustment of temperature and composition for subsequent casting. A more detailed view of an exemplary second stage reactor is shown in FIGS. 7A and 7B, wherein the length of the vessel is much greater than the other two dimensions, and bottom oxygen injection is through six tuyeres 38, defining 6 treatment zones, spaced, for example, 1.06 meters apart along the centerline of the channel bottom. Oxygen flow, in Nm$^3$/min, to the several tuyere zones may be varied, preferably to provide substantially equal stirring energy within the molten metal in each tuyere zone, for example, with oxygen flows as follows: zone 1, 4.04; zone 2, 2.18; zone 3, 1.39, zone 4, 1.74; zone 5, 1.39, and zone 6, 2.12. As a protective gas, 0.15–0.23 Nm$^3$/min natural gas or 0.38–0.58 Nm$^3$/min of CO$_2$, N$_2$ or Ar flows to each tuyere. Carbon dioxide is a preferred tuyere coolant in the second stage reactor in order to prevent possible accumulation of uncombined hydrogen and a resulting explosion hazard, such as might occur with use of methane coolant (in contrast to the first stage reactor, where oxygen blown into the foamy slag will combine with hydrogen to form water). Such number and spacing of the oxygen tuyeres in the second stage reactor are optimum for this example between attaining the level of decarburization desired and keeping the residence time of the metal melt in the furnace short to prevent backmixing and blowthrough problems. FIG. 8 relates the melt residence time to the number of tuyeres in the second stage reactor, where the carbon content of the intermediate iron-carbon alloy introduced into the second stage reactor is 1.5% and the carbon content of the final iron-carbon alloy is 0.01–0.5 weight percent. As there shown, minimum residence time for this final carbon content is achieved with about six tuyeres. As shown above, oxygen flow to each tuyere may be separately controlled as necessary to maintain a desired carbon gradient from the entry to the exit end of the reactor. In any case, total oxygen injected into the steel bath is in essentially stoichiometric amounts to reduce the carbon content of the bath to the desired level. Provision also is made for injection of argon, e.g. about 0–1.5 $Nm^3$/min, in the last two tuyeres.

The exemplary second stage reactor, as illustrated in FIGS. 7A and 7B, may have a slight slope in the downstream direction (e.g. about 1 percent) to assist metal flow, and has a first section refractory channel 60, adjacent the feed end of the reactor, wider and deeper than a second section channel 61, adjacent the exit end of the reactor. For example, the inside dimensions of the first section channel 60, zones 1 and 2, defining the liquid metal bath dimensions in that section, may be about 1.02 meter wide by 0.61 meter deep and have a length of about 2.77 meter. The second section 61, zones 3–6, may have a channel width of about 0.61 meters, a bath depth of 0.41 meters and a length of about 4.11 meters. Such a vessel provides for regulating a continuous flow of molten iron-carbon alloy in plug flow along the length of the reactor. The plug flow velocity in the second, narrower section 61 is about 0.5–0.6 meters/min., and the total metal flow is about 51,000 kg/hr. Such a reactor design also reduces sloshing of the liquid metal bath (resonant waves on the surface of the liquid metal). Metal enters the second stage reactor at a temperature between 1450° and 1550° C., preferably about 1520° C., and exits at a temperature of about 1630° C. to 1670° C.

A staged heat balance for stage 2 of the above example, and based on Table 6, is given in Table 13 below.

TABLE 13

Heat Balance-Second Stage

| Heat In | Kcal/hr | Heat Out | Kcal/hr |
|---|---|---|---|
| Fe—C intermediate using Kcal/Kg reaction: | −15782894 | Steel | 16875560 |
| C (gr) + $O_2$ = $CO_2$ reaction: | −1165818 | Dust | 170375 |
| C (gr) + 1/2 $O_2$ = C Dissolution of C | −1309754 −286808 | CO $CO_2$ Heat Loss | 624526 156203 718611 |
| TOTAL | −18545275 | | 18545275 |

As in the case of the first stage reactor, the second stage reactor 36 is designed to prevent ingress of air, so as not to burn the CO evolved from the reaction. Therefore both entry and exit of the molten metal is through submerged tapholes or siphons, as in the first stage reactor.

The gases leaving the second stage reactor 36 at the temperature of the molten metal, e.g. about 1630° C., are cooled in water cooler 41 to bring them to a condition where they can be provided to the CO burner 19 of stage 1, e.g. at a pressure of about 20 psig. As above noted, the fume from the second stage reaction is essentially pure iron, which in finely divided (e.g. about 1 micron) form is pyrophoric, so care must be taken to prevent air or other sources of oxygen from contacting this material since, in the presence of oxygen, it will burn at temperatures above about 100° C.

The input feed to the second stage process is pure enough so that very little, if any, fluxing agents are necessary. The small amount of slag formed in the second reaction is tapped periodically, e.g. from the feed end of the channel of the second stage reactor.

Flow of metal may be stopped for short periods of time to accommodate changeover from one collection vessel to another, or when there is a delay in feed material from stage 1.

In the above example, the collection ladle 43 is able to hold up to 60,000 kg of steel, and to maintain steel temperature at about 1600° C. For such purpose, the ladle 43 may be equipped with a cover (not shown) through which a burner is inserted.

Emergency emptying of the second stage reactor may be accommodated by use of a bifurcated tapping runner (not shown).

Provision is made for sampling waste gases from both the first and second stage reactors for continuous analysis of CO and $CO_2$. Flow meters and controls are provided on all oxygen and natural gas lines, and dynamic feedback is provided from gas analyzers to flow controllers via a programmed logic controller (PLC).

The two-stage reaction is critical to effective operation of the carbide-to-steel process of the invention. As described in the above specific example, the first stage reactor is a well-mixed reactor, there being no need, and indeed an impossibility, to preserve a compositional gradient along the length of the reactor and leading to simplified heat balances and process control. While the second stage reaction can be operated as a well-mixed reaction, it is preferred that plug, or laminar flow be maintained, with a carbon gradient from the entry to the exit end of the reactor. It is essential that at least a major portion of the CO evolved from this second stage reaction be collected for burning in the first stage reactor, preferably in the foamy slag layer for most efficient heat transfer from the slag to the molten metal layer in the first stage reactor. In this way, maximum energy value is extracted from the CO evolved from the second stage reaction, and the first stage reaction also is enabled to proceed essentially autogenously.

The corresponding overall material balance for the above example of the inventive process, again based on Table 6, is as follows.

TABLE 14

Overall Material Balance

| Stream | Quantity Ka/Hr |
|---|---|
| iron carbide feed | 57100 |
| flux | 3426 |
| steel | 50000 |
| slag | 5525 |
| dust | 1114 |
| decarb. $O_2$, stage 2 | 1190 |
| decarb. $O_2$, stage 1 | 3166 |
| post-comb. $O_2$, stage 1 | 4082 |
| Off-gas, stage 1 | 12416 |

For practical, commercial production, a single unit consisting of a first and second reactor is capable of producing from 25–200, especially 50–150, metric tons per hour. For larger production rates, several such units may be arranged in parallel.

The charge to the first stage reactor can comprise up to 50% of components other than the iron carbide material, such as scrap, pig iron and pre-reduced ores. In such cases, some supplemental energy input, e.g. by burning natural gas, oil or coal, generally is required if the non-carbide portion of the charge is substantial.

By separating the process into two distinct stages, eliminating the need for maintaining a concentration gradient in the first stage during continuous, steady-state operation, the operation of the process and the design of the reactor vessel is much simplified. It is much easier to operate a well-mixed process. Such a separation of the process steps also results in the fact that the energy in the gases released in the second, refining stage, not needed to make the second stage reaction autogenous, can be utilized fully to provide the energy necessary to make the first, melting stage autogenous. This recovery of CO from stage 2 to be used fully in stage 1, solves the prior art problem of proper use of the gases from the process in the proper place.

Also, by separating the process into two stages, the refining stage can be continuous, semi-continuous or batch, depending on the needs of a particular steel plant to accommodate ladle furnace or continuous casting operations.

By being completely enclosed, the inventive system substantially eliminates pollution, the dust from stage 1 can be captured and returned to the process, and the $CO_2$-rich off-gas can be cooled and collected for other use or sale.

As a continuous process, capital costs per ton of annual capacity can be reduced.

As an essentially autogenous process, operating costs can be lower than other steelmaking processes.

The process can utilize prepared scrap with a minimum of auxiliary fuel required, without significantly increasing costs.

What is claimed is:

1. A process for converting to steel an iron-base charge material containing carbon, comprising melting the charge material in a liquid iron-carbon bath contained in a first reactor, blowing oxygen into the liquid iron-carbon bath and producing in the first reactor an iron-carbon alloy of carbon content intermediate the carbon content of the charge material and a final desired steel carbon content, and refining the liquid intermediate iron-carbon alloy to steel of the desired final carbon content in a second reactor.

2. A process according to claim 1, wherein the iron-carbon bath in the first reactor is well-mixed and the liquid metal bath in the second reactor flows in essentially plug flow.

3. A process according to claim 1 or 2, wherein the process is carried out continuously.

4. A process for converting to steel an iron-base charge material containing carbon, comprising melting the charge material in a liquid iron-carbon bath contained in a first reactor, blowing oxygen into the liquid iron-carbon bath and producing in the first reactor an iron-carbon alloy of carbon content intermediate the carbon content of the charge material and a final desired steel carbon content, and refining the liquid intermediate iron-carbon alloy to steel of the desired final carbon content in a second reactor, wherein reaction of the liquid metal bath in the second reactor is facilitated by the injection of oxygen under the surface of the liquid metal bath in the second reactor and is carried out autogenously.

5. A process for converting to steel an iron-base charge material containing carbon, comprising melting the charge material in a liquid iron-carbon bath contained in a first reactor, blowing oxygen into the liquid iron-carbon bath and producing in the first reactor an iron-carbon alloy of carbon content intermediate the carbon content of the charge material and a final desired steel carbon content, and refining the liquid intermediate iron-carbon alloy to steel of the desired final carbon content in a second reactor, wherein the iron-carbon bath in the first reactor is well-mixed and the liquid metal bath in the second reactor flows in essentially plug flow, and wherein reaction of the liquid metal bath in the second reactor is facilitated by the injection of oxygen under the surface of the liquid metal bath in the second reactor and is carried out autogenously.

6. A process according to claim 4, wherein carbon monoxide generated in the second reactor is collected, kept free of air and other sources of oxygen, and is burned with oxygen in the first reactor.

7. A process according to claim 5, wherein carbon monoxide generated in the second reactor is collected, kept free of air and other sources of oxygen, and is burned with oxygen in the first reactor.

8. A process according to claim 6, further comprising developing a foamy slag layer overlying the metal bath in the first reactor and burning the carbon monoxide from the second reactor in the foamy slag layer.

9. A process according to claim 5, further comprising developing a foamy slag layer overlying the metal bath in the first reactor and burning the carbon monoxide from the second reactor in the foamy slag layer.

10. A process according to claim 8, wherein the charge material is preheated, carbon monoxide generated in the first reactor is burned in the foamy slag layer, and the reaction in the first reactor is essentially autogenous.

11. A process according to claim 8, wherein the charge material contains up to about 50% by weight of iron-based scrap and the balance of the charge is essentially particulate iron-bearing materials.

12. A process according to claim 9, wherein the charge material is preheated, carbon monoxide generated in the first reactor is burned in the foamy slag layer, and the reaction in the first reactor is essentially autogenous.

13. A process according to claim 10, wherein the process is carried out continuously.

14. A process according to claim 12, wherein the process is carried out continuously.

15. A process according to claim 2, wherein oxygen is injected into the metal baths in a first elongated reactor and second elongated reactor at spaced apart locations along a length of each of the respective reactors, and the intermediate iron-carbon alloy produced in the first reactor is deslagged before its introduction into the second reactor.

16. A process according to claim 15, further comprising post-combusting under the surface of a foamy slag contained in the first reactor carbon monoxide produced by the injection of oxygen under the surface of the metal bath in that reactor.

17. A process according to claim 16, further comprising preheating the charge material with use of the sensible heat of off-gas generated in the first reactor.

18. A steelmaking method comprising providing a first enclosed, elongated melting and decarburization reactor and a second elongated, enclosed final refining reactor, providing a bath of liquid iron-carbon alloy in the first reactor, providing a foamy slag layer overlying the liquid iron-carbon alloy bath, introducing a preheated particulate iron-base charge containing carbon into the liquid iron-carbon alloy bath, injecting oxygen into the liquid iron-carbon alloy bath thereby decarburizing the bath and forming carbon monoxide and an liquid intermediate iron-carbon alloy having a carbon content higher than a desired final carbon content, injecting oxygen into the liquid iron-carbon alloy in the second reactor thereby decarburizing the alloy and forming carbon monoxide, substantially excluding other sources of oxygen from entry into the second reactor, collecting the carbon monoxide generated in the second reactor, introducing into the first reactor additional carbon monoxide from the second reactor, burning substantially all of the carbon monoxide in the foamy slag in the first reactor with oxygen injected into the foamy slag, continuing the reaction in the first reactor in a well-mixed mode and essentially autogeneously until the carbon content of the liquid iron-carbon alloy in the first reactor reaches a desired level for introduction of the liquid iron-carbon alloy into the second reactor, deslagging the liquid iron-carbon alloy in the first reactor, and introducing the deslagged liquid iron-carbon alloy into the second reactor.

19. A method according to claim 18, wherein liquid iron-carbon alloy moves continuously through the final refining reactor in tank-in-series flow pattern with a carbon content decreasing from the entry end of the reactor to a liquid metal exit end of the reactor.

20. A process for converting an iron-base charge material containing carbon to a desired final steel having a carbon content of about 0.01% to about 0.5% carbon, comprising providing a first, elongated reactor and a second, elongated reactor, providing a liquid iron-carbon bath in the first reactor, introducing particulate iron-containing material under the surface of the liquid metal bath in the first reactor, agitating the liquid metal bath in the first reactor to a well-mixed condition by injecting oxygen into the bath through a plurality of locations spaced apart along the length and width of the first reactor and evolving carbon oxides from the metal bath by the reaction of carbon and oxygen, continuing the introduction of particulate iron-containing material and oxygen injection in the first reactor to provide a steady state reaction condition with the metal bath containing an intermediate carbon level of about 0.5% to about 2%, transferring liquid intermediate iron-carbon alloy to the second reactor, injecting oxygen into the metal bath in the second reactor through a plurality of locations spaced apart along the length of the second reactor in a manner to provide an essentially plug-type flow with a carbon gradient along the length of the reactor from the carbon content of the intermediated iron carbon alloy at a liquid metal entry end to the desired final steel carbon content at a liquid metal exit end of the second reactor, autogeneously refining the liquid intermediate iron-carbon alloy to the desired final steel carbon content, collecting carbon monoxide gas evolved in the second reactor and burning it with oxygen in the first reactor.

21. A process according to claim 20, further comprising preheating the charge fed to the first reactor, developing a foamy slag layer overlying the metal bath in the first reactor, and wherein the carbon monoxide from the second reactor and carbon monoxide generated in the first reactor is burned in the foamy slag layer to provide an essentially autogenous reaction in the first reactor.

22. A process according to claim 21, wherein the material charged into the first reactor is preheated with use of gases produced by the burning of carbon monoxide in the first reactor.

23. A process according to one of claims 20, 21, and 22, wherein the process is carried out continuously.

24. A process according to one of claims 20, 21, and 22, further comprising collecting dust emitted from the reaction carried out in the first reactor and returning the dust to the first reactor.

25. A facility for the production of steel from an iron-based charge material containing carbon, comprising:
    a first refractory-lined melting and decarburization reactor;
    means to provide a liquid iron-carbon bath and a foamy slag layer in the first reactor;
    means to introduce particulate charge material as feed into the first reactor;
    means to inject oxygen into the liquid iron-carbon bath at a plurality of locations in the first reactor;
    means to inject post-combustion oxygen above the surface of the liquid iron-carbon bath at a plurality of locations in the first reactor;
    means to inject and burn carbon monoxide with oxygen above the liquid iron-carbon bath in the first reactor;
    means to collect carbon dioxide-rich off-gas produced by the burning of carbon monoxide gas in the first reactor, and to use the sensible heat in such off-gas to preheat the charge material feed;
    means to collect dust emitted from the liquid iron-carbon bath in the first reactor and to return the dust to the first reactor;
    a separate elongated, second, refractory-lined refining reactor adapted to receive liquid iron-carbon alloy produced in the first reactor;
    means to inject oxygen into the liquid iron-carbon alloy at spaced-apart positions along the length of the second reactor;
    means to collect and cool carbon monoxide gas generated in the second reactor and to transfer it to the first reactor to be burned with oxygen therein, and
    means to collect a final liquid steel product produced in the second reactor.

26. A facility according to claim 25, wherein the means to inject post-combustion oxygen into the first reactor is adapted to inject the post-combustion oxygen under the surface of the foamy slag in the first reactor and the means to burn carbon monoxide transferred to the first reactor from the second reactor is adapted to burn the carbon monoxide under the surface of the foamy slag.

27. A facility according to claim 25, wherein the means to burn carbon monoxide from the second reactor in the first reactor is an oxygen-CO burner mounted in a wall of the first reactor and is directed downwardly at an angle from the horizontal.

28. A facility according to claim 25, wherein an exit end of the second reactor is lower than an entry end thereof.

29. A facility according to claim 25, further comprising at least one oxy/fuel burner mounted in a wall of the first reactor and adapted to assist in melting the charge material.

30. A facility according to claim 25, wherein the means to inject oxygen into the first and second reactors are gas-shrouded tuyeres.

31. A facility according to claim 30, wherein there are at least six tuyeres in the first reactor and at least six tuyeres in the second reactor.

32. A facility according to claim 25, further comprising a slag port near an exit end of the first reactor to remove slag therefrom.

33. A facility according to claim 32, further comprising a slag port in the second reactor to remove slag therefrom.

34. A facility according to claim 25, further including means to transfer liquid iron-carbon alloy product from the first reactor to the second reactor without substantial exposure of the liquid iron-carbon alloy to air.

35. A process according to one of claims 4–9, 11, 15–17, wherein the process is carried out continuously.

36. A method according to claim 15, wherein oxygen is injected into the liquid iron-carbon alloy from above the surface thereof, or from below the surface thereof, or a combination of above and below the surface thereof.

37. A method according to claim 20, wherein oxygen is injected into the metal baths in, respectively, the first reactor and the second reactor, from above the surface thereof, or from below the surface thereof, or a combination of above and below the surface thereof.

38. A process for producing steel from an iron-base charge material containing carbon comprising:
   a. providing a first reactor containing an iron-base molten metal bath;
   b. introducing carbon to the molten bath by feeding the carbon-containing charge material to the bath;
   c. introducing oxygen to the molten metal bath at a rate stoichiometrically related to the rate at which carbon is introduced so as to remove carbon from the bath at essentially the same rate at which carbon is introduced thereto; and
   d. feeding the resulting iron-carbon alloy to a separate second oxygen-refining reactor and in the second reactor refining the iron-carbon alloy to steel.

39. The process of claim 38 wherein molten metal is passed out of the first reactor so as to maintain a fixed level of the bath within the first reactor.

40. The process of claim 38 wherein the feeding of iron carbide-containing material to the bath in the first reactor is carried out at least in part during the time when molten metal is passed out of the reactor.

* * * * *